(12) United States Patent
Patel et al.

(10) Patent No.: US 11,656,987 B2
(45) Date of Patent: May 23, 2023

(54) DYNAMIC CHUNK SIZE ADJUSTMENT FOR CACHE-AWARE LOAD BALANCING

(71) Applicant: Dell Products L.P., Round Rock, TX (US)

(72) Inventors: Rimpesh Patel, Bangalore (IN); Amit Pundalik Anchi, Bangalore (IN); Sanjib Mallick, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/503,562

(22) Filed: Oct. 18, 2021

(65) Prior Publication Data

US 2023/0120010 A1 Apr. 20, 2023

(51) Int. Cl.
*G06F 12/0802* (2016.01)
*G06F 3/06* (2006.01)

(52) U.S. Cl.
CPC .......... *G06F 12/0802* (2013.01); *G06F 3/061* (2013.01); *G06F 3/0655* (2013.01); *G06F 3/0679* (2013.01); *G06F 2212/72* (2013.01)

(58) Field of Classification Search
CPC .... G06F 12/0802; G06F 3/061; G06F 3/0655; G06F 3/0679; G06F 2212/72
See application file for complete search history.

(56) References Cited

U.S. PATENT DOCUMENTS

| 6,567,397 | B1 | 5/2003 | Campana et al. |
|---|---|---|---|
| 6,687,746 | B1 | 2/2004 | Shuster et al. |
| 6,697,875 | B1 | 2/2004 | Wilson |
| 7,275,103 | B1 | 9/2007 | Thrasher et al. |

(Continued)

FOREIGN PATENT DOCUMENTS

| CN | 103677927 B | 2/2017 |
|---|---|---|
| EP | 1117028 A2 | 7/2001 |

(Continued)

OTHER PUBLICATIONS

Kris Piepho, "Dell Emc Sc Series Storage: Microsoft Multipath I/O," Dell EMC Best Practices, Jan. 2017, 57 pages.

(Continued)

*Primary Examiner* — Zhuo H Li
(74) *Attorney, Agent, or Firm* — Ryan, Mason & Lewis, LLP

(57) ABSTRACT

A method in one embodiment comprises separating logical block addresses of one or more storage devices of a storage system into a plurality of ranges of logical block addresses using a designated chunk size, the chunk size denoting a particular number of logical block addresses. The method further comprises assigning different ones of the ranges of logical block addresses to different ones of a plurality of cache entities of the storage system, to select paths for delivery of respective input-output operations from a host device to the storage system based at least in part on the assigning, detecting particular ones of the input-output operations that each overlap with two or more adjacent ranges of the plurality of ranges, and responsive to the detected input-output operations exceeding a threshold, modifying the chunk size and repeating at least portions of the separating, assigning, selecting and detecting utilizing the modified chunk size.

20 Claims, 6 Drawing Sheets

(56) References Cited

U.S. PATENT DOCUMENTS

| | | |
|---|---|---|
| 7,454,437 B1 | 11/2008 | Lavallee et al. |
| 7,617,292 B2 | 11/2009 | Moore et al. |
| 7,668,981 B1 | 2/2010 | Nagineni et al. |
| 7,770,053 B1 | 8/2010 | Bappe et al. |
| 7,809,912 B1 | 10/2010 | Raizen et al. |
| 7,818,428 B1 | 10/2010 | Lavallee et al. |
| 7,890,664 B1 | 2/2011 | Tao et al. |
| 7,904,681 B1 | 3/2011 | Bappe et al. |
| 7,925,872 B2 | 4/2011 | Lai et al. |
| 8,250,256 B2 | 8/2012 | Ghosalkar et al. |
| 8,285,825 B1 | 10/2012 | Nagaraj et al. |
| 8,825,919 B1 | 9/2014 | Lim et al. |
| 8,832,334 B2 | 9/2014 | Okita |
| 8,874,746 B1 | 10/2014 | Gonzalez |
| 9,026,694 B1 | 5/2015 | Davidson et al. |
| 9,201,803 B1 | 12/2015 | Derbeko et al. |
| 9,400,611 B1 | 7/2016 | Raizen |
| 9,430,368 B1 | 8/2016 | Derbeko et al. |
| 9,594,780 B1 | 3/2017 | Esposito et al. |
| 9,647,933 B1 | 5/2017 | Tawri et al. |
| 9,672,160 B1 | 6/2017 | Derbeko et al. |
| 9,778,852 B1 | 10/2017 | Marshak et al. |
| 10,289,325 B1 | 5/2019 | Bono |
| 10,353,714 B1 | 7/2019 | Gokam et al. |
| 10,439,878 B1 | 10/2019 | Tah et al. |
| 10,474,367 B1 | 11/2019 | Mallick et al. |
| 10,476,960 B1 | 11/2019 | Rao et al. |
| 10,521,369 B1 | 12/2019 | Mallick et al. |
| 10,606,496 B1 | 3/2020 | Mallick et al. |
| 10,613,755 B1 * | 4/2020 | Sela .................. G06F 3/061 |
| 10,637,917 B2 | 4/2020 | Mallick et al. |
| 10,652,206 B1 | 5/2020 | Pusalkar et al. |
| 10,754,572 B2 | 8/2020 | Kumar et al. |
| 10,757,189 B2 | 8/2020 | Mallick et al. |
| 10,764,371 B2 | 9/2020 | Rao et al. |
| 10,789,006 B1 | 9/2020 | Gokam et al. |
| 10,817,181 B2 | 10/2020 | Mallick et al. |
| 10,838,648 B2 | 11/2020 | Sharma et al. |
| 10,880,217 B2 | 12/2020 | Mallick et al. |
| 10,884,935 B1 | 1/2021 | Doddaiah |
| 10,911,402 B2 | 2/2021 | Pusalkar et al. |
| 11,086,785 B2 | 8/2021 | Anchi et al. |
| 2002/0023151 A1 | 2/2002 | Iwatani |
| 2002/0103923 A1 | 8/2002 | Cherian et al. |
| 2004/0010563 A1 | 1/2004 | Forte et al. |
| 2006/0026346 A1 | 2/2006 | Kadoiri et al. |
| 2006/0277383 A1 | 12/2006 | Hayden et al. |
| 2007/0174849 A1 | 7/2007 | Cheung et al. |
| 2008/0043973 A1 | 2/2008 | Lai et al. |
| 2008/0201458 A1 | 8/2008 | Salil |
| 2008/0301332 A1 | 12/2008 | Butler et al. |
| 2009/0259749 A1 | 10/2009 | Barrett et al. |
| 2010/0313063 A1 | 12/2010 | Venkataraja et al. |
| 2011/0197027 A1 | 8/2011 | Balasubramanian et al. |
| 2011/0296230 A1 | 12/2011 | Chen et al. |
| 2012/0102369 A1 | 4/2012 | Hiltunen et al. |
| 2012/0246345 A1 | 9/2012 | Contreras et al. |
| 2013/0117766 A1 | 5/2013 | Bax et al. |
| 2013/0339551 A1 | 12/2013 | Flanagan et al. |
| 2014/0105068 A1 | 4/2014 | Xu |
| 2015/0222705 A1 | 8/2015 | Stephens |
| 2015/0242134 A1 | 8/2015 | Takada et al. |
| 2016/0092136 A1 | 3/2016 | Balakrishnan et al. |
| 2016/0117113 A1 | 4/2016 | Li et al. |
| 2016/0335003 A1 | 11/2016 | Ahmed et al. |
| 2017/0235507 A1 | 8/2017 | Sinha et al. |
| 2017/0308317 A1 * | 10/2017 | Kodama .................. G06F 3/067 |
| 2018/0181347 A1 * | 6/2018 | Botman .................. G06F 3/0673 |
| 2018/0189635 A1 | 7/2018 | Olarig et al. |
| 2018/0253256 A1 | 9/2018 | Bharadwaj |
| 2018/0317101 A1 | 11/2018 | Koue |
| 2019/0095299 A1 | 3/2019 | Liu et al. |
| 2019/0108888 A1 | 4/2019 | Sarkar et al. |
| 2019/0334987 A1 | 10/2019 | Mallick et al. |
| 2020/0021653 A1 | 1/2020 | Rao et al. |
| 2020/0097203 A1 | 3/2020 | Mallick et al. |
| 2020/0106698 A1 | 4/2020 | Rao et al. |
| 2020/0110552 A1 | 4/2020 | Kumar et al. |
| 2020/0112608 A1 | 4/2020 | Patel et al. |
| 2020/0192588 A1 | 6/2020 | Kumar et al. |
| 2020/0204475 A1 | 6/2020 | Mallick et al. |
| 2020/0204495 A1 | 6/2020 | Mallick et al. |
| 2020/0213274 A1 | 7/2020 | Pusalkar et al. |
| 2020/0241890 A1 | 7/2020 | Mallick et al. |
| 2020/0314218 A1 | 10/2020 | Kumar et al. |
| 2020/0348860 A1 | 11/2020 | Mallick et al. |
| 2020/0348861 A1 | 11/2020 | Marappan et al. |
| 2020/0348869 A1 | 11/2020 | Gokam |
| 2020/0349094 A1 | 11/2020 | Smith et al. |
| 2020/0363985 A1 | 11/2020 | Gokam et al. |
| 2020/0372401 A1 | 11/2020 | Mallick et al. |
| 2021/0019054 A1 | 1/2021 | Anchi et al. |
| 2021/0026551 A1 | 1/2021 | Tidke et al. |
| 2021/0026650 A1 | 1/2021 | Rao et al. |
| 2021/0089460 A1 * | 3/2021 | Anchi .................. G06F 12/0873 |
| 2021/0157502 A1 | 5/2021 | Rao et al. |
| 2021/0181965 A1 | 6/2021 | Anchi et al. |
| 2022/0029640 A1 * | 1/2022 | Eisenhuth .............. G06F 3/0679 |

FOREIGN PATENT DOCUMENTS

| | | |
|---|---|---|
| EP | 2667569 A1 | 11/2013 |
| WO | PCT/US2019/052549 | 12/2019 |
| WO | PCT/US2019/053204 | 12/2019 |
| WO | PCT/US2019/053473 | 12/2019 |
| WO | PCT/US2019/067144 | 5/2020 |

OTHER PUBLICATIONS

NVM Express, "NVM Express, Revision 1.3," NVM Express, May 1, 2017, 282 pages.

VMware, "Multipathing Configuration for Software iSCSI Using Port Binding," Technical White Paper, Apr. 25, 2012, 15 pages.

Dell EMC, "Dell EMC SC Series Storage: Microsoft Multipath I/O," Dell EMC Engineering, Jun. 2017, 56 pages.

DELL EMC, "Dell EMC PowerPath Family: PowerPath and PowerPath/VE Multipathing," Data Sheet, 2017, 3 pages.

EMC, "EMC PowerPath and PowerPath/VE Family for Windows," Installation and Administration Guide, Oct. 2018, 102 pages.

EMC, "EMC Powerpath Load Balancing and Failover", Comparison with native MPIO operating system solutions, Feb. 2011, 28 pages.

Dell EMC, "PowerMax OS," Dell EMC PowerMax Family Product Guide, May 2019, 192 pages.

Dell EMC, "Dell EMC SC Series Storage and Microsoft Multipath I/O," CML 1004, Jul. 2018, 36 pages.

VMware, Inc. "VMware VMFS Volume Management," 2009, 8 pages.

Dell EMC, "Dell EMC Unity: Virtualization Integration," Technical White Paper, Oct. 2019, 39 pages.

Dell EMC, "Dell EMC PowerMax: iSCSI Implementation for Dell EMC Storage Arrays Running PowerMaxOS," Technical White Paper, Sep. 2019, 35 pages.

E. Goggin et al., "Linux Multipathing," Proceedings of the Linux Symposium, vol. 1, 2005, 21 pages.

K. Ueda et al., "Request-based Device-mapper Multipath and Dynamic Load Balancing," Proceedings of the Linux Symposium, vol. 2, 2007, 9 pages.

U.S. Appl. No. 17/383,672 filed in the name of Amit Pundalik Anchi et al. filed Jul. 23, 2021, and entitled "Multi-Path Layer Configured to Access Storage-Side Performance Metrics for Load Balancing Policy Control."

* cited by examiner

FIG. 4

400 — PERFORMANCE METRICS MAINTAINED BY STORAGE ARRAY FOR LOCAL CACHES

| LUN 1 | CACHE-RELATED PERFORMANCE METRICS |
| LUN 2 | CACHE-RELATED PERFORMANCE METRICS |
| ... | ... |
| LUN X | CACHE-RELATED PERFORMANCE METRICS |

DYNAMIC CHUNK SIZE ADJUSTMENT FOR CACHE-AWARE LOAD BALANCING

FIELD

The field relates generally to information processing systems, and more particularly to storage in information processing systems.

BACKGROUND

Storage arrays and other types of storage systems are often shared by multiple host devices over a network. Applications running on the host devices each include one or more processes that perform the application functionality. The processes issue input-output (IO) operations directed to particular logical storage volumes or other logical storage devices, for delivery by the host devices over selected paths to storage ports of the storage system. Different ones of the host devices can run different applications with varying workloads and associated IO patterns. Such host devices also generate additional IO operations in performing various data services such as migration and replication. In these and other situations involving processing of IO requests received from a host device, a storage system may utilize one or more local caches in processing the received IO requests. For example, write requests received from a given host device may be initially stored in one or more write caches of the storage system, and then acknowledged back to the host device, before being destaged to a destination storage device of the storage system. Performance of the storage system in these and other situations that involve processing IO requests received from one or more host devices can be adversely impacted by cache-related issues of the storage system.

SUMMARY

Illustrative embodiments configure at least one processing device, such as one or more host devices, to provide dynamic chunk size adjustment for storage cache aware load balancing. The one or more host devices illustratively communicate with a storage array or other type of storage system via a storage area network (SAN) or other type of network. The one or more host devices illustratively comprise a multi-path layer that includes at least one multi-path input-output (MPIO) driver configured to process IO operations of at least one host device.

These and other illustrative embodiments implement a storage cache aware load balancing policy with a dynamically adjustable chunk size that can avoid the above-noted adverse impacts of cache-related issues of the storage system.

In one embodiment, an apparatus comprises at least one processing device that includes a processor and a memory, with the processor being coupled to the memory. The at least one processing device is configured to separate logical block addresses of one or more storage devices of a storage system into a plurality of ranges of logical block addresses using a designated chunk size, the chunk size denoting a particular number of logical block addresses. The at least one processing device is further configured to assign different ones of the ranges of logical block addresses to different ones of a plurality of cache entities of the storage system, to select paths for delivery of respective IO operations from a host device to the storage system based at least in part on the assigning, to detect particular ones of the IO operations that each overlap with two or more adjacent ranges of the plurality of ranges, and responsive to the detected IO operations exceeding a threshold, to modify the chunk size and to repeat at least portions of the separating, assigning, selecting and detecting utilizing the modified chunk size.

The at least one processing device illustratively comprises at least a portion of the host device, and in some embodiments can comprise portions of one or more other devices, such as an associated host management station.

In some embodiments, at least portions of the separating, assigning, selecting and detecting are implemented in a multi-path layer comprising at least one MPIO driver of the host device, although other arrangements are possible.

The cache entities of the storage system illustratively comprise respective components of the storage system that have respective local caches associated therewith. Additionally or alternatively, the cache entities of the storage system comprise respective storage controllers of the storage system with each such storage controller having a different local cache associated therewith.

In some embodiments, modifying the chunk size illustratively comprises doubling the chunk size, possibly subject to a specified maximum chunk size. Other types of chunk size modification can be used.

The threshold utilized to trigger modification of the chunk size may be specified in terms of a number of detected IO operations within a monitoring interval, in terms of a percentage of detected IO operations relative to a total number of issued IO operations within a monitoring interval, or using other techniques.

In some embodiments, the chunk size is modified responsive to the detected IO operations exceeding the threshold in a first interval, and the chunk size is further modified in each of one or more additional intervals in which the detected IO operations that each overlap with two or more adjacent ranges of the plurality of ranges exceed the threshold. It is also possible that the chunk size can be decreased under certain conditions.

Additionally or alternatively, the at least one processing device is further configured to determine whether or not a maximum chunk size has been reached, and responsive to detection of one or more additional IO operations that each overlap with two or more adjacent ranges of the plurality of ranges after the maximum chunk size has been reached, to modify one or more commands associated with the one or more additional detected IO operations to bypass utilization of one or more cache entities of the storage system.

In some embodiments, the MPIO driver is configured to utilize storage-side performance metrics obtained from the storage system to dynamically switch between a storage cache aware load balancing policy and one or more other available load balancing policies, in a manner that improves the overall performance of the storage system.

An example storage cache aware load balancing policy illustratively comprises accessing, for each of one or more storage devices a stored mapping between ranges of logical block addresses of the storage device and respective ones of a plurality of cache entities of the storage system, and for each of one or more IO operations, identifying a particular one of the cache entities based at least in part on a logical block address of the IO operation and the stored mapping, and selecting a particular one of a plurality of paths for delivery of the IO operation to the storage system based at least in part on the identified cache entity. The mapping is illustratively generated at least in part using information obtained from the storage system and characterizing the cache entities of the storage system.

These and other illustrative embodiments include, without limitation, apparatus, systems, methods and computer program products comprising processor-readable storage media.

BRIEF DESCRIPTION OF THE DRAWINGS

FIG. 4 shows an example of storage-side performance information maintained by a storage system for use in storage cache aware processing of IO operations in an illustrative embodiment.

DETAILED DESCRIPTION

Illustrative embodiments will be described herein with reference to exemplary information processing systems and associated computers, servers, storage devices and other processing devices. It is to be appreciated, however, that embodiments of the present disclosure are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center that includes one or more clouds hosting multiple tenants that share cloud resources. Numerous other types of enterprise and cloud-based computing and storage systems are also encompassed by the term "information processing system" as that term is broadly used herein.

Figure 1:
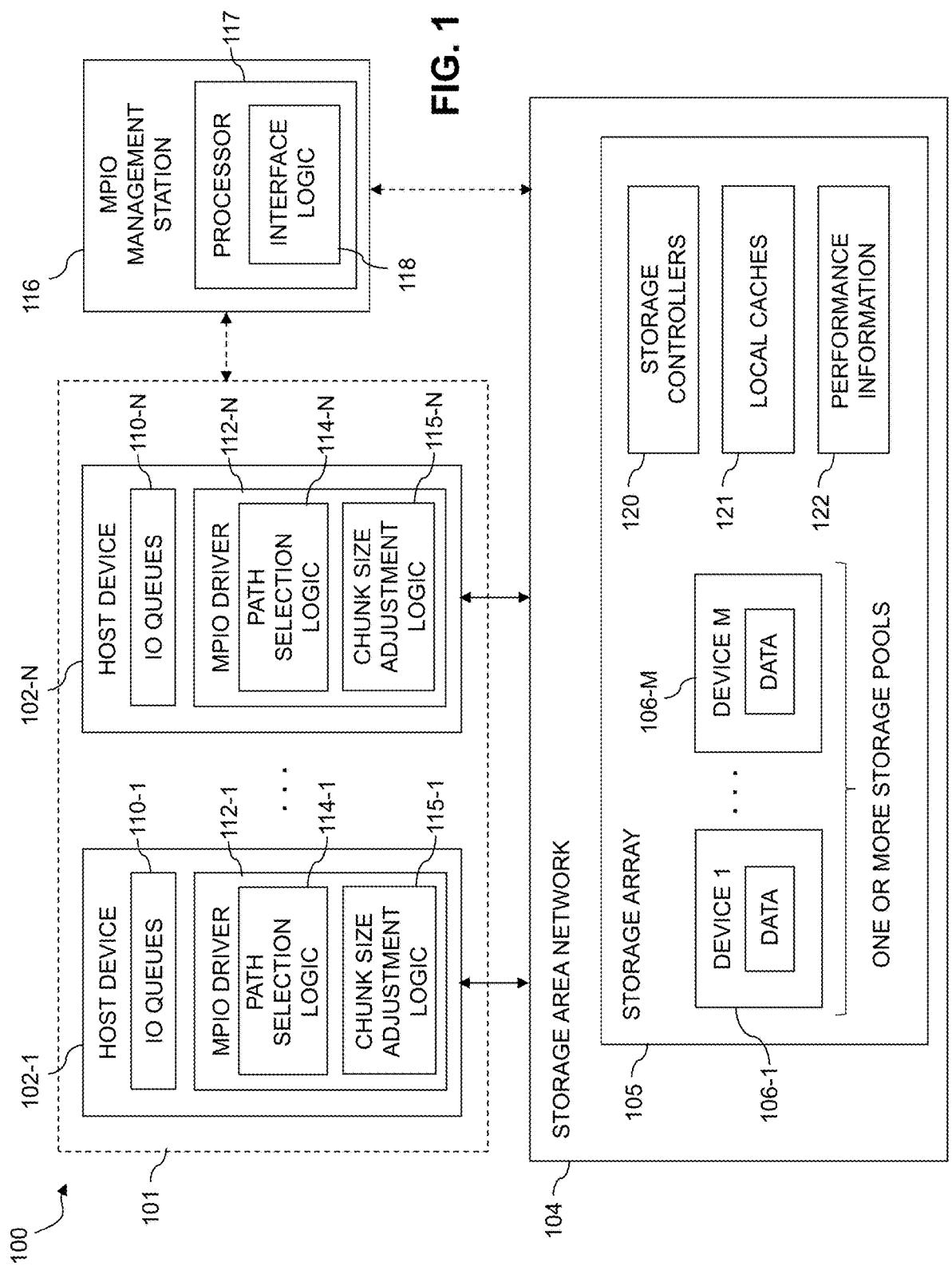
FIG. 1 is a block diagram of an information processing system configured with functionality for dynamic chunk size adjustment in a multi-path layer of a host device in an illustrative embodiment.

FIG. 1 shows an information processing system 100 configured in accordance with an illustrative embodiment. The information processing system 100 comprises a computer system 101 that includes a plurality of host devices 102-1, . . . 102-N. The host devices 102 communicate over a storage area network (SAN) 104 with at least one storage array 105. The storage array 105 comprises a plurality of storage devices 106-1, . . . 106-M each storing data utilized by one or more applications running on one or more of the host devices 102. The storage devices 106 are illustratively arranged in one or more storage pools. The storage array 105 and its associated storage devices 106 are an example of what is more generally referred to herein as a "storage system." This storage system in the present embodiment is shared by the host devices 102, and is therefore also referred to herein as a "shared storage system." Other embodiments can include only a single host device, possibly configured to have exclusive use of the storage system.

The host devices 102 illustratively comprise respective computers, servers or other types of processing devices capable of communicating with the storage array 105 of the SAN 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102.

The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model, a Function-as-a-Service (FaaS) model and/or a Storage-as-a-Service (STaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The storage devices 106 of the storage array 105 of SAN 104 implement logical units (LUNs) configured to store objects for users associated with the host devices 102. These objects can comprise files, blocks or other types of objects. The host devices 102 interact with the storage array 105 utilizing read and write commands as well as other types of commands that are transmitted over the SAN 104. Such commands in some embodiments more particularly comprise Small Computer System Interface (SCSI) commands, although other types of commands can be used in other embodiments. A given IO operation as that term is broadly used herein illustratively comprises one or more such commands. References herein to terms such as "input-output" and "IO" should be understood to refer to input and/or output. Thus, an IO operation relates to at least one of input and output.

Also, the term "storage device" as used herein is intended to be broadly construed, so as to encompass, for example, a logical storage device such as a LUN or other logical storage volume. A logical storage device can be defined in the storage array 105 to include different portions of one or more physical storage devices. Storage devices 106 may therefore be viewed as comprising respective LUNs or other logical storage volumes.

Each of the host devices 102 illustratively has multiple paths to the storage array 105, with at least one of the storage devices 106 of the storage array 105 being visible to that host device on a given one of the paths. A given one of the storage devices 106 may be accessible to the given host device over multiple paths.

Different ones of the storage devices 106 of the storage array 105 illustratively exhibit different latencies in processing of IO operations. In some cases, the same storage device may exhibit different latencies for different ones of multiple paths over which that storage device can be accessed from a given one of the host devices 102.

The host devices 102, SAN 104 and storage array 105 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102 and the storage array 105 may be implemented on respective distinct processing platforms, although numerous other arrangements are possible. For example, in some embodiments at least portions of the host devices 102 and the storage array 105 are implemented on the same processing platform. The storage array 105 can therefore be implemented at least in part within at least one processing platform that implements at least a subset of the host devices 102.

The SAN 104 may be implemented using multiple networks of different types to interconnect storage system components. For example, the SAN 104 may comprise a portion of a global computer network such as the Internet, although other types of networks can be part of the SAN 104, including a wide area network (WAN), a local area network (LAN), a satellite network, a telephone or cable network, a cellular network, a wireless network such as a WiFi or WiMAX network, or various portions or combinations of these and other types of networks. The SAN 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand (IB), Gigabit Ethernet or Fibre Channel (FC). Numerous alternative networking arrangements are possible in a given embodiment, as will be appreciated by those skilled in the art.

The host devices 102 comprise respective sets of IO queues 110-1, . . . 110-N and respective MPIO drivers 112-1, . . . 112-N. The MPIO drivers 112 collectively comprise a multi-path layer of the host devices 102. Path selection functionality for delivery of IO operations from the host devices 102 to the storage array 105 is provided in the multi-path layer by respective instances of path selection logic 114-1, . . . 114-N implemented within the MPIO drivers 112. The multi-path layer further provides functionality for dynamic chunk size adjustment. Such functionality is provided at least in part using respective instances of chunk size adjustment logic 115-1, . . . 115-N implemented within the MPIO drivers 112.

The MPIO drivers 112 may comprise, for example, otherwise conventional MPIO drivers, such as PowerPath® drivers from Dell Technologies, suitably modified in the manner disclosed herein to provide functionality for dynamic chunk size adjustment. Other types of MPIO drivers from other driver vendors may be suitably modified to incorporate functionality for dynamic chunk size adjustment as disclosed herein.

The host devices 102 can include additional or alternative components. For example, in some embodiments, the host devices 102 comprise respective local caches, implemented using respective memories of those host devices. A given such local cache can be implemented using one or more cache cards, possibly implementing caching techniques such as those disclosed in U.S. Pat. Nos. 9,201,803, 9,430,368 and 9,672,160, each entitled "System and Method for Caching Data," and incorporated by reference herein. A wide variety of different caching techniques can be used in other embodiments, as will be appreciated by those skilled in the art. Other examples of memories of the respective host devices 102 that may be utilized to provide local caches include one or more memory cards or other memory devices, such as, for example, an NVMe over PCIe cache card, a local flash drive or other type of NVM storage drive, or combinations of these and other host memory devices.

The system 100 further comprises an MPIO management station 116 that includes a processor 117 implementing interface logic 118. The interface logic 118 is utilized to communicate with the host devices 102 and the storage array 105. Such an MPIO management station 116 provides management functionality for the multi-path layer comprising the MPIO drivers 112 of the host devices 102. In some embodiments, host device management software executing on the MPIO management station 116 interacts with storage array management software executing on the storage array 105.

The MPIO driver 112-1 is configured to deliver IO operations selected from its corresponding set of IO queues 110-1 to the storage array 105 via selected ones of multiple paths over the SAN 104. The sources of the IO operations stored in the set of IO queues 110-1 illustratively include respective processes of one or more applications executing on the host device 102-1. For example, IO operations can be generated by each of multiple processes of a database application running on the host device 102-1. Such processes issue IO operations for delivery to the storage array 105 over the SAN 104. Other types of sources of IO operations may be present in a given implementation of system 100.

A given IO operation is therefore illustratively generated by a process of an application running on the host device 102-1, and is queued in a given one of the IO queues 110-1 of the host device 102-1 with other operations generated by other processes of that application, and possibly other processes of other applications.

The paths from the host device 102-1 to the storage array 105 illustratively comprise paths associated with respective initiator-target pairs, with each initiator comprising a host bus adaptor (HBA) or other initiating entity of the host device 102-1 and each target comprising a port or other targeted entity corresponding to one or more of the storage devices 106 of the storage array 105. As noted above, the storage devices 106 illustratively comprise LUNs or other types of logical storage devices.

In some embodiments, the paths are associated with respective communication links between the host device 102-1 and the storage array 105 with each such communication link having a negotiated link speed. For example, in conjunction with registration of a given HBA to a switch of the SAN 104, the HBA and the switch may negotiate a link speed. The actual link speed that can be achieved in practice in some cases is less than the negotiated link speed, which is a theoretical maximum value.

Various scheduling algorithms, load balancing algorithms and/or other types of algorithms can be utilized by the MPIO driver 112-1 in delivering IO operations from the IO queues 110-1 to the storage array 105 over particular paths via the SAN 104. Each such IO operation is assumed to comprise one or more commands for instructing the storage array 105 to perform particular types of storage-related functions such as reading data from or writing data to particular logical volumes of the storage array 105. Such commands are assumed to have various payload sizes associated therewith, and the payload associated with a given command is referred to herein as its "command payload."

A command directed by the host device 102-1 to the storage array 105 is considered an "outstanding" command until such time as its execution is completed in the viewpoint of the host device 102-1, at which time it is considered a "completed" command. The commands illustratively comprise respective SCSI commands, although other command formats can be used in other embodiments. A given such command is illustratively defined by a corresponding command descriptor block (CDB) or similar format construct. The given command can have multiple blocks of payload associated therewith, such as a particular number of 512-byte SCSI blocks or other types of blocks.

In illustrative embodiments to be described below, it is assumed without limitation that the initiators of a plurality of initiator-target pairs comprise respective HBAs of the host device 102-1 and that the targets of the plurality of initiator-target pairs comprise respective ports of the storage array 105. Examples of such HBAs and storage array ports are illustrated in conjunction with the embodiment of FIG. 3.

Selecting a particular one of multiple available paths for delivery of a selected one of the IO operations of the set of IO queues 110-1 is more generally referred to herein as "path selection." Path selection as that term is broadly used herein can in some cases involve both selection of a particular IO operation and selection of one of multiple possible paths for accessing a corresponding logical device of the storage array 105. The corresponding logical device illustratively comprises a LUN or other logical storage volume to which the particular IO operation is directed.

It should be noted that paths may be added or deleted between the host devices 102 and the storage array 105 in the system 100. For example, the addition of one or more new paths from host device 102-1 to the storage array 105 or the deletion of one or more existing paths from the host device 102-1 to the storage array 105 may result from respective addition or deletion of at least a portion of the storage devices 106 of the storage array 105.

Addition or deletion of paths can also occur as a result of zoning and masking changes or other types of storage system reconfigurations performed by a storage administrator or other user. Some embodiments are configured to send a predetermined command from the host device 102-1 to the storage array 105, illustratively utilizing the MPIO driver 112-1, to determine if zoning and masking information has been changed. The predetermined command can comprise, for example, a log sense command, a mode sense command, a "vendor unique command" or VU command, or combinations of multiple instances of these or other commands, in an otherwise standardized command format.

In some embodiments, paths are added or deleted in conjunction with addition of a new storage array or deletion of an existing storage array from a storage system that includes multiple storage arrays, possibly in conjunction with configuration of the storage system for at least one of a migration operation and a replication operation.

For example, a storage system may include first and second storage arrays, with data being migrated from the first storage array to the second storage array prior to removing the first storage array from the storage system.

As another example, a storage system may include a production storage array and a recovery storage array, with data being replicated from the production storage array to the recovery storage array so as to be available for data recovery in the event of a failure involving the production storage array.

In these and other situations, path discovery scans may be repeated as needed in order to discover the addition of new paths or the deletion of existing paths.

A given path discovery scan can be performed utilizing known functionality of conventional MPIO drivers, such as PowerPath® drivers.

The path discovery scan in some embodiments may be further configured to identify one or more new LUNs or other logical storage volumes associated with the one or more new paths identified in the path discovery scan. The path discovery scan may comprise, for example, one or more bus scans which are configured to discover the appearance of any new LUNs that have been added to the storage array 105 as well to discover the disappearance of any existing LUNs that have been deleted from the storage array 105.

The MPIO driver 112-1 in some embodiments comprises a user-space portion and a kernel-space portion. The kernel-space portion of the MPIO driver 112-1 may be configured to detect one or more path changes of the type mentioned above, and to instruct the user-space portion of the MPIO driver 112-1 to run a path discovery scan responsive to the detected path changes. Other divisions of functionality between the user-space portion and the kernel-space portion of the MPIO driver 112-1 are possible. The user-space portion of the MPIO driver 112-1 is illustratively associated with an Operating System (OS) kernel of the host device 102-1.

For each of one or more new paths identified in the path discovery scan, the host device 102-1 may be configured to execute a host registration operation for that path. The host registration operation for a given new path illustratively provides notification to the storage array 105 that the host device 102-1 has discovered the new path.

In the FIG. 1 embodiment, the storage array 105 comprises a plurality of storage controllers 120, one or more sets of local caches 121, and one or more instances of storage-side performance information 122.

The storage controllers 120 illustratively control the processing of IO operations received in the storage array 105 from the host devices 102. For example, the storage controllers 120 illustratively manage the processing of read and write commands directed by the MPIO drivers 112 to particular ones of the storage devices 106. The storage controllers 120 can be implemented as respective storage processors, directors or other storage system components configured to control storage system operations relating to processing of IO operations.

In some embodiments, each of the storage controllers 120 has a different one of the local caches 121 associated therewith, although numerous alternative arrangements are possible. The storage controllers 120 are examples of what are more generally referred to herein as "cache entities" of the storage array 105. A given "cache entity" of a storage system as the term is broadly used herein is intended to encompass a storage controller, storage processor or other system component that has a local cache or other type of cache allocated thereto or otherwise associated therewith. The caches illustratively include local caches 121, although other types of caches can be used in other embodiments. These are considered examples of "storage caches" as they are implemented in the storage array 105 or other type of storage system, rather than in host devices 102. The term "storage cache" as broadly used herein therefore refers to a cache implemented in a storage system.

Accordingly, in some embodiments, the cache entities of the storage array 105 comprise respective storage controllers 120 of the storage array 105 that have respective local caches 121 associated therewith. As another example, in some embodiments, each of the storage controllers 120 has a different allocated portion of a global cache associated therewith, and such allocated portions of a global cache can be considered respective instances of local caches 121 associated with respective storage controllers 120.

The storage-side performance information 122 is illustratively maintained by the storage array 105 for respective LUNs or other logical storage devices, and can be arranged, for example, in the manner illustrated in the example of FIG. 4, or utilizing other types and arrangements of tables or other data structures.

It is assumed that the MPIO drivers 112 of the respective host devices 102 can read or otherwise obtain at least portions of the storage-side performance information 122 directly or indirectly from the storage array 105.

For example, at least portions of the storage-side performance information 122 can be obtained by the host device 102-1 from the storage array 105 utilizing an in-band communication mechanism in which one or more predetermined commands in a designated storage protocol are sent from the host device 102-1 to the storage array 105. Such predetermined commands can comprise, for example, a log sense command, a mode sense command, a "vendor unique command" or VU command, or combinations of multiple instances of these or other commands, in an otherwise standardized command format, such as a SCSI format, NVMe format or other type of format.

A wide variety of different arrangements of commands may be used, as well as numerous associated timing techniques for repeatedly sending such commands from the host device 102-1 to the storage array 105. A "command" as the term is broadly used herein can comprise a combination of multiple distinct commands, such as respective different commands for different ones of a plurality of logical storage devices. Separate commands are utilized in some embodiments to obtain storage-side performance information for respective logical storage devices. In other embodiments, a single command can be sent to obtain storage-side performance information for multiple logical storage devices. These and other references herein to sending a command from a host device to a storage array to obtain storage-side performance information are intended to be broadly construed.

Additionally or alternatively, at least portions of the storage-side performance information 122 can be obtained by the host device 102-1 from the storage array 105 utilizing an out-of-band communication mechanism. For example, an out-of-band communication mechanism of this type can involve host management software of the host device 102-1 communicating with storage array management software of the storage array 105 over an IP network connection or other type of network connection. Such host management software can include software running on the MPIO management station 116, in addition to or in place of software running on the individual host devices 102.

The MPIO driver 112-1 in some embodiments is configured to obtain at least portions of the storage-side performance information 122 maintained by storage array 105 in conjunction with processing of IO operations directed to the storage array 105 by host device 102-1 over SAN 104, to dynamically select a particular one of a plurality of distinct load balancing policies available in the host device 102-1 based at least in part on the obtained storage-side performance information, and to apply the selected load balancing policy in directing additional IO operations from the host device 102-1 to the storage array 105. In some embodiments, at least portions of the above-noted operations can be performed at least in part by other components of the host device 102-1 or by other processing devices, such as the MPIO management station 116.

The storage-side performance information is illustratively obtained from the storage array utilizing at least one of an in-band communication mechanism in which one or more commands in a designated storage protocol are sent from the host device 102-1 to the storage array 105, and an out-of-band communication mechanism in which host management software of the host device 102-1 communicates with storage system management software of the storage array 105 over an IP connection or other type of network connection.

At least one of the load balancing policies illustratively comprises a storage cache aware load balancing policy that causes different ones of the IO operations to be directed to different cache entities of the storage array 105 based at least in part on cache-related performance metrics of the obtained storage-side performance information.

The cache entities of the storage array 105 illustratively comprise respective components of the storage array 105 that have respective ones of the local caches 121 associated therewith. For example, the cache entities of the storage array 105 may comprise respective storage controllers 120 of the storage array 105 with each such storage controller having a different one of the local caches 121 associated therewith.

In some embodiments, dynamically selecting a particular one of the plurality of distinct load balancing policies available in the host device based at least in part on the obtained storage-side performance information comprises automatically switching between at least a first load balancing policy that is storage cache aware and a second load balancing policy that is not storage cache aware.

The first load balancing policy illustratively utilizes cache-related performance metrics of the obtained storage-side performance information in load balancing decisions, while the second load balancing policy illustratively does not utilize cache-related performance metrics of the obtained storage-side performance information in load balancing decisions. For example, the second load balancing policy can comprise an adaptive load balancing policy or another type of load balancing policy that is not storage cache aware.

In some embodiments, the storage-side performance information comprises cache collision rates for respective cache entities of the storage array 105.

In such an arrangement, dynamically selecting a particular one of the plurality of distinct load balancing policies available in the host device based at least in part on the obtained storage-side performance information comprises automatically selecting a first load balancing policy that is storage cache aware to replace a second load balancing policy that is not storage cache aware responsive to cache collision rates for respective cache entities of the storage array 105 exceeding a specified threshold.

In accordance with an example storage cache aware load balancing policy, the MPIO driver 112-1 in some embodiments is further configured to access for each of one or more of the storage devices 106 a stored mapping between ranges of logical block addresses (LBAs) of the storage device and respective ones of a plurality of cache entities of the storage array 105. In some embodiments, each of the storage devices 106 has a corresponding distinct stored mapping of this type accessible to the MPIO driver 112-1.

For each of at least a subset of the IO operations, the MPIO driver 112-1 determines the particular storage device to which the IO operation is directed, and accesses the stored mapping for that storage device, also referred to as the "target storage device" of the IO operation. The MPIO driver 112-1 identifies a particular one of the cache entities, based at least in part on an LBA of the IO operation and the stored mapping, and selects a particular one of the paths for delivery of the IO operation to the storage array 105 based at least in part on the identified cache entity. Accordingly, the storage cache aware processing functionality of the MPIO driver 112-1 selects an appropriate path for delivery of the IO operation to the storage array 105, based at least in part on a particular cache entity identified using an LBA of the IO operation and the stored mapping of the target storage device, and the IO operation is then delivered to the storage array 105 over the SAN 104 via the selected path.

Additional examples of storage cache aware processing of IO operations are described below in conjunction with the embodiments of FIGS. 5 and 6.

The above-noted stored mapping of LBA ranges to respective ones of the cache entities of the storage array, such as respective ones of the storage controllers 120, is illustratively generated at least in part by the MPIO driver 112-1 and stored in one or more data structures of a kernel-space portion of an operating system of the host device 102-1. Alternatively, other components of the host device 102-1 can be involved in at least one of the generating and the storage of the mapping for a given one of the storage devices 106, using other types of data structures or storage arrangements.

In some embodiments, a given such mapping is generated at least in part using information obtained from the storage array 105 and characterizing the cache entities of the storage array 105, such as the storage controllers 120.

For example, the information characterizing the cache entities of the storage array 105 for use in generating the mapping illustratively comprises information identifying the storage controllers 120 of the storage array 105 that have respective local caches 121 associated therewith, information about the local caches 121, and a chunk size associated with the local caches 121, where the chunk size denotes a particular number of LBAs.

The information characterizing the cache entities of the storage array 105 for use in generating the mapping can be obtained by the host device 102-1 from the storage array 105 utilizing an in-band communication mechanism in which one or more predetermined commands in a designated storage protocol are sent from the host device 102-1 to the storage array 105. Such predetermined commands can comprise, for example, a log sense command, a mode sense command, a "vendor unique command" or VU command, or combinations of multiple instances of these or other commands, in an otherwise standardized command format, such as a SCSI format or other type of format.

Additionally or alternatively, the information characterizing the cache entities of the storage array 105 for use in generating the mapping can be obtained by the host device 102-1 from the storage array 105 utilizing an out-of-band communication mechanism. For example, an out-of-band communication mechanism of this type can involve host management software of the host device 102-1 communicating with storage array management software of the storage array 105 over an IP network connection or other type of network connection.

The MPIO driver 112-1 in some embodiments is configured to implement dynamic chunk size adjustment in conjunction with cache-aware processing of IO operations utilizing storage cache aware load balancing as described above. In conjunction with the dynamic chunk size adjustment functionality, the MPIO driver 112-1 separates LBAs of one or more storage devices of the storage array 105 into a plurality of ranges of LBAs using a designated chunk size, illustratively a predetermined initial chunk size, with the chunk size denoting a particular number of LBAs. A mapping of the type described previously is generated by assigning different ones of the ranges of LBAs to different ones of a plurality of cache entities of the storage array 105. One or more of the cache entities of the storage array 105 may each be assigned multiple distinct ones of the ranges of LBAs.

The MPIO driver 112-1 via its path selection logic 114-1 selects paths for delivery of respective IO operations from the host device 102-1 to the storage array 105 based at least in part on the assigning. The MPIO driver 112-1 via its chunk size adjustment logic 115-1 detects particular ones of the IO operations that each overlap with two or more adjacent ranges of the plurality of ranges, and responsive to the detected IO operations exceeding a threshold, modifies the chunk size and to repeats at least portions of the separating, assigning, selecting and detecting utilizing the modified chunk size.

In some embodiments, modifying the chunk size comprises doubling the chunk size, possibly subject to a specified maximum chunk size. Other types of modifications of chunk size can be used in other embodiments.

The threshold utilized to trigger modification of the chunk size is illustratively specified in terms of a number of detected IO operations within a monitoring interval. Alternatively, the threshold can be specified in terms of a percentage of detected IO operations relative to a total number of issued IO operations within a monitoring interval, or using other types of measures characterizing amounts of detected IO operations. The detected IO operations that each overlap with two or more adjacent ranges of the plurality of ranges of LBAs are also referred to herein as "overlapping" IO operations.

In some embodiments, the chunk size is modified responsive to the detected overlapping IO operations exceeding the threshold in a first interval, and then further modified in each of one or more additional intervals in which the detected overlapping IO operations for that interval also exceed the threshold. Under certain conditions, such as an absence of at least a threshold amount of detected overlapping IO operations for one or more intervals, the chunk size can be decreased, such as reduced in half.

Additionally or alternatively, in some embodiments, the MPIO driver 112-1 via its chunk size adjustment logic 115-1 can determine whether or not a maximum chunk size has been reached, and responsive to detection of one or more additional overlapping IO operations after the maximum chunk size has been reached, modify one or more commands associated with the one or more additional detected IO operations to bypass utilization of one or more cache entities of the storage array 105.

An example of a process illustrating one possible implementation of the above-noted dynamic chunk size adjustment functionality will be described below in conjunction with the flow diagram of FIG. 2.

Again, in some embodiments, at least portions of the above-described dynamic chunk size adjustment functionality can be performed at least in part by other components of the host device 102-1 or by other processing devices, such as the MPIO management station 116, rather than by the MPIO driver 112-1. References herein to such functionality being performed by "at least one processing device" can refer to the host device 102-1 or a portion thereof, or multiple processing devices possibly including multiple host devices 102 and/or the MPIO management station 116. Numerous other arrangements of one or more processing devices can be used to implement the techniques disclosed herein.

As indicated previously, a mapping of the assignments of ranges of LBAs to respective ones of the cache entities is illustratively stored in one or more data structures of the host device 102-1 and accessed by the MPIO driver 112-1 in conjunction with selecting the paths for delivery of the IO operations to the storage array 105.

Selecting paths for delivery of respective IO operations in some embodiments more particularly comprises accessing for a given one of the one or more storage devices 106 the above-noted stored mapping between ranges of LBAs of the storage device and respective ones of the cache entities of the storage array 105. The path selection further involves, for each of at least a subset of the IO operations, identifying a particular one of the cache entities based at least in part on an LBA of the IO operation and the stored mapping, and selecting a particular one of a plurality of paths for delivery of the IO operation to the storage array 105 based at least in part on the identified cache entity.

In some embodiments, each of a plurality of LUNs or other logical storage devices 106 of storage array 105 have their respective ranges of LBAs virtually divided or otherwise separated into repetitive chunks of chunk size B, where B is illustratively 4096 LBAs although other values could be used. Each such chunk is mapped to a corresponding storage controller, storage director or other cache entity of the storage array 105 associated with a particular one of the local caches of the storage array 105.

It should be noted that the chunk size can be specified in number of LBAs, as in the above example, or in a corresponding memory size associated with those LBAs, which is given by the number of LBAs times the memory size per LBA. Other types of chunk sizes can be used in other embodiments.

In many situations, there could be certain IO operations whose starting LBA and ending LBA do not fall on the same chunk. Such IO operations are referred to herein as "overlapping" IOs since they each overlap two or more different chunks.

As a result, regardless of which storage controller, storage director or other cache entity of the storage array 105 is chosen as part of the path selection, there is an increased likelihood of performance penalties such as cache misses, as well as computation-intensive coordination activities between multiple storage controllers or directors, as would typically arise in the case of so-called "slot collisions."

Illustrative embodiments disclosed herein therefore configure the MPIO driver 112-1 to detect such overlapping IOs and to dynamically adjust the chunk size if the number of overlapping IOs detected within a particular time period exceeds a user-configurable threshold. For example, the threshold may be set to a particular percentage (e.g., 10% or 20%) of IOs within a given monitoring interval.

In such an embodiment, if at least the threshold percentage of IOs processed by the MPIO driver 112-1 within the monitoring interval are overlapping IO operations, the MPIO driver 112-1 can automatically trigger an increase in the chunk size, such as a doubling in chunk size from 4096 LBAs to 8192 LBAs, although other types of dynamic increases in the chunk size can be used in other embodiments.

This dynamic adjustment in chunk size based on detection of overlapping IO operations can potentially reduce the number of overlapping IO operations by about half, resulting in considerably reduced performance impacts from cache misses and slot collisions. Accordingly, IO latency is reduced and overall system performance is improved.

An example algorithm for implementing the above-described dynamic adjustment in chunk size based on detected overlapping IOs illustratively includes the following steps, although additional or alternative steps could be used in other embodiments:

1. The MPIO driver 112-1 monitors overlapping IO operations periodically for a predefined time window or other type of monitoring interval and keeps track of the number of such occurrences.

2. If the number of overlapping IO operations reaches the specified threshold, the MPIO driver 112-1 enforces a new chunk size (e.g., double the previous chunk size) for the storage cache aware load balancing policy. The chunk size is permitted to "grow" in this manner up to a specified maximum chunk size. The maximum chunk size, like the threshold, is illustratively a user-configurable parameter. By way of example, for a given LUN or other storage device, the chunk size doubling process can be capped such that the doubled chunk size cannot exceed a predetermined maximum chunk size, such as 32 MB, so the chunk size will grow, for example, from 128 KB to a maximum of 32 MB. The trigger for doubling the chunk size is illustratively the detected number of overlapped IOs exceeding the specified threshold (e.g., 10% of IOs, 20% of IOs, or other user-configurable value).

3. The MPIO driver 112-1 continues to monitor the number of overlapping IO operations in one or more subsequent intervals for efficacy, and makes further adjustments in the chunk size as needed. Such adjustments can include not only further increases in the chunk size, but also decreases in the chunk size as appropriate.

In some embodiments, if overlapping IO operations are detected as primarily spanning two adjacent chunks, then the MPIO driver 112-1 would automatically double the existing chunk size to obtain the new chunk size, in the manner previously described. For example, if overlapping IO operations are primarily skewed towards odd number chunks as the starting LBA of the overlapping IO operations (e.g., overlapping IO operations have their starting LBAs mapped to chunks 1, 3, 5, . . . and their ending LBAs mapped to chunks 2, 4, 6, . . . ), the MPIO driver 112-1 can be configured to adjust the chunk size so as to ensure that the two consecutive chunks under the previous chunk size will become a single chunk when the chunk size is doubled. Similar arrangements can be used to determine an appropriate modification in chunk size based on other types of detected overlapping IO operations.

With the above-described example algorithm, a significant reduction in overlapping IO operations is achieved with increasing chunk size. However, any further sporadic overlapping IO operations detected after reaching the maximum chunk size (e.g., 32 MB, user-configurable) can be handled by setting the IO command context for those IO operations to bypass the local cache in the storage array 105. This local cache bypass for a given IO operation illustratively includes setting flags such as a Force Unit Access (FUA) bit and a Disable Page Out (DPO) bit in a SCSI CDB of the IO operation, with similar adjustments provided in other storage access protocols such as NVMe. Such an arrangement allows all or substantially all detected overlapping IO operations to be addressed by a combination of (i) doubling or otherwise increasing the chunk size, and (ii) bypassing the local cache in the storage array 105 through appropriate of setting of the IO command context using the relevant flags as mentioned above for any overlapping IOs that fall below the overlapping IO threshold.

In embodiments in which a given LUN or other storage device is shared by multiple ones of the host devices 102, it is generally desirable to maintain consistency of the chunk size and other storage cache aware load balancing policy settings across all the host devices 102 that share that LUN or other storage device. This can be achieved using the MPIO management station 116, which illustratively implements host management software for coordinating the operation of multi-pathing functionality across the host devices 102.

For example, the MPIO management station 116, which illustratively has knowledge of shared LUNs and any changes in chunk size or other policy settings, can be responsible for applying such changes to all host devices 102 that share those particular LUNs. This functionality can involve use of an existing PowerPath® MPIO event alert mechanism or other suitable notifications from the MPIO driver 112-1 to inform the MPIO management station 116 of changes in policy parameter settings such as the change in chunk size for a given LUN. Such an arrangement allows the MPIO management station 116 to take proactive action to apply this change to all other host devices 102 sharing this LUN.

As noted above, some embodiments advantageously achieve an approximately 50% reduction of contentions on the storage array side by doubling the chunk size responsive to at least a threshold amount of detected overlapping IO operations. This substantially reduces the latency of the IO operations and hence significantly improves the overall performance of the system. The mapping of LBA ranges to cache entities of the storage array 105 is based on the dynamically adjusted chunk size, as described previously.

In some embodiments, the mapping is generated for a given one of the storage devices 106 using the following steps:

1. Determining a size of the storage device in terms of a total number of LBAs within that storage device.

2. Separating the total number of LBAs of the storage device into a plurality of ranges of LBAs.

3. Assigning different ones of the ranges of LBAs to different ones of the cache entities of the storage array 105.

As noted above, the cache entities of the storage array 105 comprise respective ones of the storage controllers 120. One or more of the cache entities are each assigned multiple distinct ones of the ranges of LBAs, utilizing the steps of the process described above. The resulting assignments of ranges of LBAs to respective ones of the cache entities comprise the mapping which is stored in the host device 102-1 so as to be accessible to the MPIO driver 112-1 in providing storage cache aware processing of IO operations as disclosed herein.

In some embodiments, separating the total number of LBAs of the storage device into a plurality of ranges of LBAs in Step 2 above comprises separating the total number of LBAs into the plurality of ranges of LBAs using a designated chunk size, with the chunk size denoting a particular number of LBAs. As described herein, the chunk size is dynamically adjustable based at least in part on detection of overlapping IO operations, leading to improved overall system performance.

A particular one of the cache entities is identified based at least in part on an LBA of the IO operation and the stored mapping using the following steps:

1. Determining an initial LBA and a transfer length for the IO operation.

2. Computing a target LBA based at least in part on the initial LBA and the transfer length.

3. Identifying a particular LBA range that includes the target LBA.

4. Utilizing the stored mapping to identify the particular one of the cache entities corresponding to the particular LBA range.

The target LBA referred to in Steps 2 and 3 above is different than the initial LBA, and illustratively comprises an approximate midpoint LBA between the initial LBA and a final LBA as indicated by the transfer length. Other types of target LBAs can be used in identifying LBA ranges and corresponding cache entities.

In some embodiments, the MPIO driver 112-1 is further configured to maintain multiple path sets associated with respective ones of the cache entities of the storage array 105. In embodiments of this type, selecting a particular one of the paths for delivery of the IO operation to the storage array 105 in the path selection logic 114-1 based at least in part on the identified cache entity more particularly comprises identifying from the path sets at least one path set associated with the identified cache entity, and selecting the particular path from the identified path set.

These and other functions related to storage cache aware processing of IO operations that are referred to herein as being performed by or under the control of the MPIO driver 112-1 can in some embodiments be performed at least in part outside of the MPIO driver 112-1, such as in the host device 102-1 generally.

References herein to an MPIO driver such as MPIO driver 112-1 being configured to access "stored mappings" are intended to be broadly construed, and should not be viewed as being limited to any particular storage arrangement, such as storage in a particular host device component or using a particular format. Accordingly, such storage can be in a memory or other storage device that is outside of the MPIO driver.

Various conditions can lead to generation of new stored mappings, updating of existing stored mappings and/or deletion of existing stored mappings in illustrative embodiments. For example, the addition of a new storage device to the set of storage devices 106 can trigger the creation of a new stored mapping for that storage device. Similarly, the deletion of an existing storage device from the set of storage devices 106 can trigger the removal of an existing stored mapping for that storage device from the system.

It is to be appreciated that the term "stored mapping" as used herein is intended to be broadly construed, as so to encompass a wide variety of different types of stored information and associated storage arrangements for relating LBA ranges to cache entities of a storage array or other storage system.

As indicated previously, absent use of the techniques for storage cache aware processing of IO operations in a multi-path layer as disclosed herein, performance of the storage system in processing IO requests received from a host device can be adversely impacted by cache-related issues of the storage system. For example, a host-based load balancing algorithm that is unaware of the particular cache entity configuration of a storage system can inadvertently cause an increased number of cache misses, thereby increasing the processing overhead of the storage system and degrading its performance.

As an illustration of a problematic situation of the type described above, consider a simple example of a storage array having two controllers C1 and C2 with respective local caches CA1 and CA2. The two controllers C1 and C2 have respective ports P1 and P2. Assume that a write IO having an LBA offset of 100 is delivered from the multi-path layer of a host device to the storage array via port P1 of controller C1 and is therefore written to the local cache CA1 of controller C1. Further assume that the next write IO has the same LBA offset of 100. However, due to load balancing performed in conjunction with path selection by the multi-path layer of the host device, that write IO is delivered to the storage array via port P2 of controller C2 and is therefore written to the local cache CA2 of controller C2. The load balancing has therefore turned what might have been a cache hit in local cache CA1 into a cache miss in the local cache CA2. In addition, the previously-written data at LBA offset 100 in local cache CA1 will have to be marked as "dirty" and subsequently updated. Read IOs can cause similar adverse performance impacts within the storage array.

Such drawbacks are advantageously overcome in illustrative embodiments herein by utilization of a multi-path layer comprising one or more of the MPIO drivers 112 to provide, for example, storage cache aware processing of IO operations as described above. These embodiments therefore provide a significant advance over conventional techniques that do not take storage cache arrangements of the storage system into account in path selection. For example, storage cache aware arrangements of the type disclosed herein can substantially reduce cache misses by better matching a load balancing algorithm or other type of path selection algorithm of a multi-path layer of a host device to the cache entity configuration of the storage system, leading to improved overall performance.

The storage-side performance information 122 is not restricted to cache-related performance metrics, and can additionally or alternatively include a wide variety of other types of performance metrics, such as, for example, response time metrics, read/write ratios, write count, write pending count, bandwidth consumption and numerous others, illustrative maintained on a per-device basis, where the "device" refers to a LUN or other type of logical storage device.

The above-described functionality associated with dynamic chunk size adjustment is illustratively performed primarily by the MPIO driver 112-1 of the host device 102-1, utilizing its chunk size adjustment logic 115-1 in cooperation with its path selection logic 114-1, although other arrangements are possible. For example, these and other functions referred to herein as being performed by an MPIO driver can in other embodiments be performed at least in part by other host device components.

An example of a set of storage-side performance information 122 maintained by the storage array 105 for respective LUNs or other logical storage devices is illustrated in FIG. 4. It is assumed that the storage array 105 maintains similar storage-side performance information for each of at least a subset of the logical storage devices of the storage array 105.

As noted above, in some embodiments, storage-side performance information is obtained directly by the host device 102-1 from storage array 105. Such an arrangement illustratively utilizes an in-band communication mechanism in which one or more commands in a designated storage protocol are sent from the host device 102-1 to the storage array 105.

It is possible in other embodiments that storage-side performance information can be obtained by the host device 102-1 indirectly from the storage array 105 utilizing an out-of-band communication mechanism via at least one intermediary device. An intermediary device in such an embodiment illustratively comprises the MPIO management station 116 of system 100. The MPIO management station 116 can comprise a server configured to obtain the storage-side performance information directly from the storage array 105. The MPIO management station 116 is illustratively connected directly to the storage array 105 using protocols such as SCSI, Internet SCSI (iSCSI), FC, NVMeoFC and/or others.

The MPIO driver 112-1 on the host device 102-1 illustratively has connectivity to the MPIO management station 116. The MPIO management station 116 in some embodiments implements PowerPath® Management Appliance (PPMA) functionality to obtain access to the storage array 105. The MPIO driver 112-1 can obtain from the MPIO management station 116 certain types of storage array related information for use in various operations performed at least in part by the MPIO driver 112-1, in addition to or in place of obtaining such information directly from the storage array 105. Host multi-pathing software can be used to implement a multi-path layer comprising MPIO drivers 112 of respective host devices 102 as well as related management appliance software such as the above-noted PPMA of MPIO management station 116. Such host multi-pathing software can be configured to obtain storage-side performance information or other types of information to facilitate dynamic chunk size adjustment for one or more host devices as disclosed herein.

Additionally or alternatively, PPMA functionality of the MPIO management station 116 can be used to ensure that all of the host devices 102 that share a particular LUN or other storage device all utilize the same chunk size and other policy parameters for storage cache aware processing of IO operations targeting that storage device.

Some embodiments herein configure host devices 102 to include functionality for dynamic chunk size adjustment based at least in part on detection of overlapping IO operations, so as to advantageously avoid the complications of conventional approaches.

Load balancing policies implemented by the multi-path layer comprising MPIO drivers 112 of host devices 102 are generally configured to provide balanced distribution of application workload to the storage array 105. In some embodiments, the MPIO drivers 112 are configured to measure different host-side performance metrics such as, for example, number of active read and write blocks, read and write response times, read and write percentages, application workload patterns, and numerous others. However, excessive reliance on such host-side performance metrics can negatively impact application performance, due at least in part to the additional CPU cycles required to make such performance measurements.

The use of storage-side performance metrics as disclosed herein not only alleviates these negative performance impacts on application performance, it can provide enhanced performance by avoiding slot collisions and other types of negative impacts attributable to cache-related entities of the storage array 105.

The slot collisions illustratively include contentions that arise when multiple directors or other storage controllers 120 of the storage array 105 access the same cache line. A storage cache aware load balancing policy as disclosed herein is advantageously configured to avoid such slot collisions. For example, a storage cache aware load balancing policy when enabled can ensure that slot collisions are avoided by distributing IO operations using a mapping of cache lines to each of a plurality of directors or other storage controllers 120 of the storage array 105. The use of such a policy can provide significant performance improvements, particularly under conditions otherwise associated with a high level of slot collisions.

Illustrative embodiments herein provide a trigger based on storage-side performance metrics, possibly supplemented by host-side performance metrics, that controls when the storage cache aware load balancing policy is applied in the host device. This avoids problems that might otherwise arise if the storage cache aware load balancing policy were used under all conditions. For example, the storage cache aware load balancing policy typically works effectively in optimizing application workload when there is a relatively balanced mix of read and write IOs, but for some application workload patterns having higher write to read ratios, the storage cache aware load balancing policy can be less effective than other load balancing policies available in the host device.

In some embodiments, the storage array 105 collects performance metrics for all storage access and provides a holistic view of all workloads coming from multiple hosts. Examples of parameters that can be captured by the storage array 105 include host IOPS, read/write response time, read/write percentages, read/write randomness, director/controller load, slot collisions, etc. These metrics are illustratively captured at one or more granularities, such as storage group, storage controller, storage device, array port, etc. These and other storage-side performance metrics are examples of what is more generally referred to herein as "storage-side performance information" and are made available to the MPIO drivers 112 of the host devices 102 in order to provide significantly enhanced load balancing, particularly with regard to dynamic selection between a load balancing policy that is storage cache aware and another load balancing policy that is not storage cache aware.

In some embodiments, an example implementation comprises the following components, although additional or alternative components could be used:

1. Storage array management software (e.g., Unisphere for PowerMax™) running on storage array 105 or a related device.

2. MPIO software (e.g., PowerPath®) running in a software stack of host devices 102.

3. PowerPath Management Appliance (PPMA) implemented in MPIO management station 116.

Unisphere has access to and publishes different storage performance metrics at various granularity of host groups, storage groups, storage controllers, storage devices, storage array ports etc. Third-party software like PowerPath® can be configured to obtain access to these performance metrics from Unisphere through a Representational State Transfer (REST) application programming interface (API). Some of these performance metrics include host IOPS, read/write RT, workload pattern on storage device, sequential write/read, controller metrics, and cache metrics such as read/write hit percentage, read/write randomness, read/write percentage, etc.

PowerPath® multi-pathing software manages storage devices and implements load balancing policies to distribute IO using its knowledge of application IO workload and visibility of storage endpoints. PowerPath® also has a feature called Performance Metrics Insight (PMI) that provides host-side view of storage performance.

PPMA manages hosts running PowerPath® software and also has visibility of storage connectivity to each of the PowerPath® hosts along with access to PowerPath® host PMI data. PPMA can be configured (one time activity) to access Unisphere through REST API to get the performance metrics for the storage managed by PowerPath® on a host. PPMA can provide a centralized view of workload and performance metrics both from the storage array and from PowerPath® running on one or more hosts to build a performance monitoring and decision making platform that takes both these inputs to make sure customers can get the best of PowerPath® load balancing capabilities.

The storage array 105 in some embodiments collects various performance metrics (e.g., cache/slot collisions, director/controller busy, read/write RT, etc.) and provides a detailed view of all workloads generated by multiple hosts attached to it via an interface such as Unisphere. Multipathing software like PowerPath® implements various load balancing policies such as an adaptive policy and a cache aware policy, and since no policy is perfect/optimal for all types of workload/environment situations, illustrative embodiments herein build intelligence into multipathing software intuitive enough to fine tune load balancing parameters and/or switch between such load balancing policy based on performance metrics generated by the storage array 105.

An illustrative embodiment in which portions of the functionality are provided using PPMA, implemented by MPIO management station 116 and modified to operate in accordance with techniques disclosed herein, is as follows.

1. PPMA collects storage performance statistics from Unisphere (e.g., using REST API) at the granularity of storage device being accessed by PowerPath® and also provides a holistic view of incoming workloads from all hosts on storage endpoints.

2. PPMA collects storage performance statistics from PowerPath® for the managed storage devices and workload distribution across storage endpoints.

3. PPMA monitors and pushes the key performance parameters to PowerPath® for analysis and load balancing policy selection and/or tuning of load balancing parameters.

The above-noted PPMA arrangement illustratively implemented by MPIO management station 116 is illustratively configured to provide, in cooperation with the MPIO drivers 112, a performance monitoring and decision making platform that has access to both storage-side performance metrics from the storage array 105 and host-side performance metrics from the host devices 102.

Examples of dynamic load balancing policy control implemented in illustrative embodiments include the following.

In a first example, if the slot collision rate as detected by the MPIO driver in the obtained storage-side performance information is greater than an upper threshold (e.g., 20% default, user configurable) then the MPIO driver will select and apply a storage cache aware load balancing policy. Similarly, if the slot collision rate as detected by the MPIO driver in the obtained storage-side performance information is less than a lower threshold (e.g., 5% default, user configurable) then the MPIO driver will fall back to an adaptive load balancing policy (or another fallback policy as configured).

In a second example, if the load imbalance across directors/controllers (globally) as detected by the MPIO driver in the obtained storage-side performance information is greater than an upper threshold (e.g., 30% default, user configurable) and if the host-side load imbalance (locally) is greater than a local threshold (e.g., 5%, user configurable) then the MPIO driver would select and apply an adaptive load balancing policy (or another load balancing policy that is not storage cache aware, as configured). Similarly, if the load imbalance across directors/controllers (globally) as detected by the MPIO driver in the obtained storage-side performance information is below a lower threshold (e.g., 5% default, user configurable) then the MPIO driver would select and apply the storage cache aware load balancing policy.

The foregoing are just illustrative examples, and numerous other types of dynamic switching between load balancing policies based at least in part on storage-side performance information, possibly supplemented by host-side performance information, can be used in other embodiments.

In some embodiments, the MPIO drivers 112 of the host devices 102 are configured to obtain an application IO workload pattern by deriving it from storage array performance metrics like read/write response time, sequential read/write percentage, read/write randomness, read/write percentages, skew, etc.

Illustrative embodiments herein provide MPIO software with access to storage-side performance metrics to build an efficient load balancing policy based on these inputs. Such arrangements avoid excessive use of host-side software measurement logic that consumes additional CPU cycles resulting in overall performance impact when compared to having access to storage array metrics.

Some embodiments are implemented in the form of an algorithm performed by cooperative interaction between the MPIO driver 112-1 of a given one of the host devices 102-1 and the storage array 105, utilizing path selection logic 114-1 and chunk size adjustment logic 115-1. Such an algorithm is more particularly implemented by cooperative interaction of instances of path selection logic 114 and chunk size adjustment logic 115 of MPIO drivers 112 of host devices 102, and storage controllers 120 of storage array 105, possibly with involvement of other components of system 100, such as MPIO management station 116, which can provide the above-noted PPMA functionality.

Illustrative embodiments provide significant advantages over conventional practice. For example, these embodiments provide an efficient algorithm for dynamic adjustment of chunk size in storage cache aware load balancing, as well as dynamic selection between multiple available load balancing policies that leverages storage-side performance information maintained in a storage array.

These and other embodiments avoid the negative host performance implications of excessive cache misses and slot collisions. As a result, IO processing performance is improved, and the system can more easily meet its performance goals.

The portions of the example techniques described above as being performed by a given MPIO driver 112-1 on a corresponding host device 102-1 can be similarly performed by other MPIO drivers 112 on respective other host devices 102. Such MPIO drivers 112 illustratively form a multi-path layer comprising multi-pathing software of the host devices. Other types of host drivers can be used in other embodiments. For example, in some embodiments, at least a portion of the disclosed dynamic chunk size adjustment functionality is carried out using one or more iSCSI drivers, or other types of non-MPIO host drivers.

Additional examples of dynamic chunk size adjustment arrangements will be described elsewhere herein in conjunction with the embodiments of FIGS. 2 through 6. Other types of dynamic chunk size adjustment arrangements can be used in other embodiments.

These and other functions related to dynamic chunk size adjustment that are referred to herein as being performed by or under the control of the MPIO driver 112-1 can in some embodiments be performed at least in part outside of the MPIO driver 112-1, such as in the host device 102-1 generally.

The above-described functions associated with dynamic chunk size adjustment in the MPIO driver 112-1 in some embodiments are carried out at least in part under the control of its chunk size adjustment logic 115-1, illustratively operating in cooperation with path selection logic 114-1. For example, the chunk size adjustment logic 115-1 is illustratively configured to control performance of one or more steps of the process in the flow diagram to be described below in conjunction with FIG. 2. In other embodiments, one or more such steps can be more generally performed by the host device 102-1.

It is assumed that each of the other MPIO drivers 112 is configured in a manner similar to that described above and elsewhere herein for the first MPIO driver 112-1. The other host devices 102 of the system 100 are therefore also configured to communicate over the SAN 104 with the storage array 105. The MPIO drivers 112 of such other host devices are each similarly configured to deliver IO operations from its corresponding one of the sets of IO queues 110 to the storage array 105 over selected paths through the SAN 104, and to perform the disclosed functionality for dynamic chunk size adjustment.

Accordingly, functionality described above in the context of the first MPIO driver 112-1 and the first host device 102-1 is assumed to be similarly performed by each of the other MPIO drivers 112-2 through 112-N and/or more generally by their respective host devices 102-2 through 102-N.

The MPIO drivers 112 may be otherwise configured utilizing well-known MPIO functionality. Such conventional MPIO functionality is suitably modified in illustrative embodiments disclosed herein to support dynamic chunk size adjustment.

Although in some embodiments certain commands used by the host devices 102 to communicate with the storage array 105 illustratively comprise SCSI commands, other types of commands and command formats can be used in other embodiments. For example, some embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF.

The storage array 105 in the present embodiment is assumed to comprise a persistent memory that is implemented using a flash memory or other type of non-volatile memory of the storage array 105. More particular examples include NAND-based flash memory or other types of non-volatile memory such as resistive RAM, phase change memory, spin torque transfer magneto-resistive RAM (STT-MRAM) and Intel Optane™ devices based on 3D XPoint™ memory. The persistent memory is further assumed to be separate from the storage devices 106 of the storage array 105, although in other embodiments the persistent memory may be implemented as a designated portion or portions of one or more of the storage devices 106. For example, in some embodiments the storage devices 106 may comprise flash-based storage devices, as in embodiments involving all-flash storage arrays, or may be implemented in whole or in part using other types of non-volatile memory.

As mentioned above, communications between the host devices 102 and the storage array 105 may utilize PCIe connections or other types of connections implemented over one or more networks. For example, illustrative embodiments can use interfaces such as Internet SCSI (iSCSI), Serial Attached SCSI (SAS) and Serial ATA (SATA). Numerous other interfaces and associated communication protocols can be used in other embodiments.

The storage array 105 in some embodiments may be implemented as part of cloud infrastructure in the form of a cloud-based system such as an Amazon Web Services (AWS) system. Other examples of cloud-based systems that can be used to provide at least portions of the storage array 105 and possibly other portions of system 100 include Google Cloud Platform (GCP) and Microsoft Azure.

The storage devices 106 of the storage arrays 105 can be implemented using solid state drives (SSDs). Such SSDs are implemented using non-volatile memory (NVM) devices such as flash memory. Other types of NVM devices that can be used to implement at least a portion of the storage devices 106 include non-volatile random access memory (NVRAM), phase-change RAM (PC-RAM) and magnetic RAM (MRAM). These and various combinations of multiple different types of NVM devices or other storage devices may also be used. For example, hard disk drives (HDDs) can be used in combination with or in place of SSDs or other types of NVM devices. Accordingly, numerous other types of electronic or magnetic media can be used in implementing at least a subset of the storage devices 106.

The storage array 105 may additionally or alternatively be configured to implement multiple distinct storage tiers of a multi-tier storage system. By way of example, a given multi-tier storage system may comprise a fast tier or performance tier implemented using flash storage devices or other types of SSDs, and a capacity tier implemented using HDDs, possibly with one or more such tiers being server based. A wide variety of other types of storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, SSDs, HDDs, flash drives, hybrid drives or other types of storage products and devices, or portions thereof, and illustratively include logical storage devices such as LUNs.

As another example, the storage array 105 may be used to implement one or more storage nodes in a cluster storage system comprising a plurality of storage nodes interconnected by one or more networks.

It should therefore be apparent that the term "storage array" as used herein is intended to be broadly construed, and may encompass multiple distinct instances of a commercially-available storage array. For example, the storage array 105 may comprise one or more storage arrays such as one or more VMAX®, Unity™ or PowerMax™ storage arrays, commercially available from Dell Technologies.

Other types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

In some embodiments, a storage system comprises first and second storage arrays arranged in an active-active configuration. For example, such an arrangement can be used to ensure that data stored in one of the storage arrays is replicated to the other one of the storage arrays utilizing a synchronous replication process. Such data replication across the multiple storage arrays can be used to facilitate failure recovery in the system 100. One of the storage arrays may therefore operate as a production storage array relative to the other storage array which operates as a backup or recovery storage array.

It is to be appreciated, however, that embodiments disclosed herein are not limited to active-active configurations or any other particular storage system arrangements. Accordingly, illustrative embodiments herein can be configured using a wide variety of other arrangements, including, by way of example, active-passive arrangements, active-active Asymmetric Logical Unit Access (ALUA) arrangements, and other types of ALUA arrangements.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and one or more associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. Thus, it is possible in some implementations of the system 100 for different ones of the host devices 102 to reside in different data centers than the storage array 105.

Numerous other distributed implementations of the host devices 102 and/or the storage array 105 are possible. Accordingly, the storage array 105 can also be implemented in a distributed manner across multiple data centers.

It is to be appreciated that these and other features of illustrative embodiments are presented by way of example only, and should not be construed as limiting in any way. Accordingly, different numbers, types and arrangements of system components such as host devices 102, SAN 104, storage array 105, storage devices 106, sets of IO queues 110, and MPIO drivers 112, including their corresponding instances of path selection logic 114 and chunk size adjustment logic 115, can be used in other embodiments.

It should also be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

The operation of the information processing system 100 will now be described in further detail with reference to the flow diagram of the illustrative embodiment of FIG. 2. The process as shown includes steps 200 through 208, and is suitable for use in the system 100 but is more generally applicable to other types of systems comprising at least one host device and a storage system. The storage system in this embodiment is assumed to comprise at least one storage array having a plurality of storage devices. The storage devices can include logical storage devices such as LUNs or other logical storage volumes.

Figure 2:
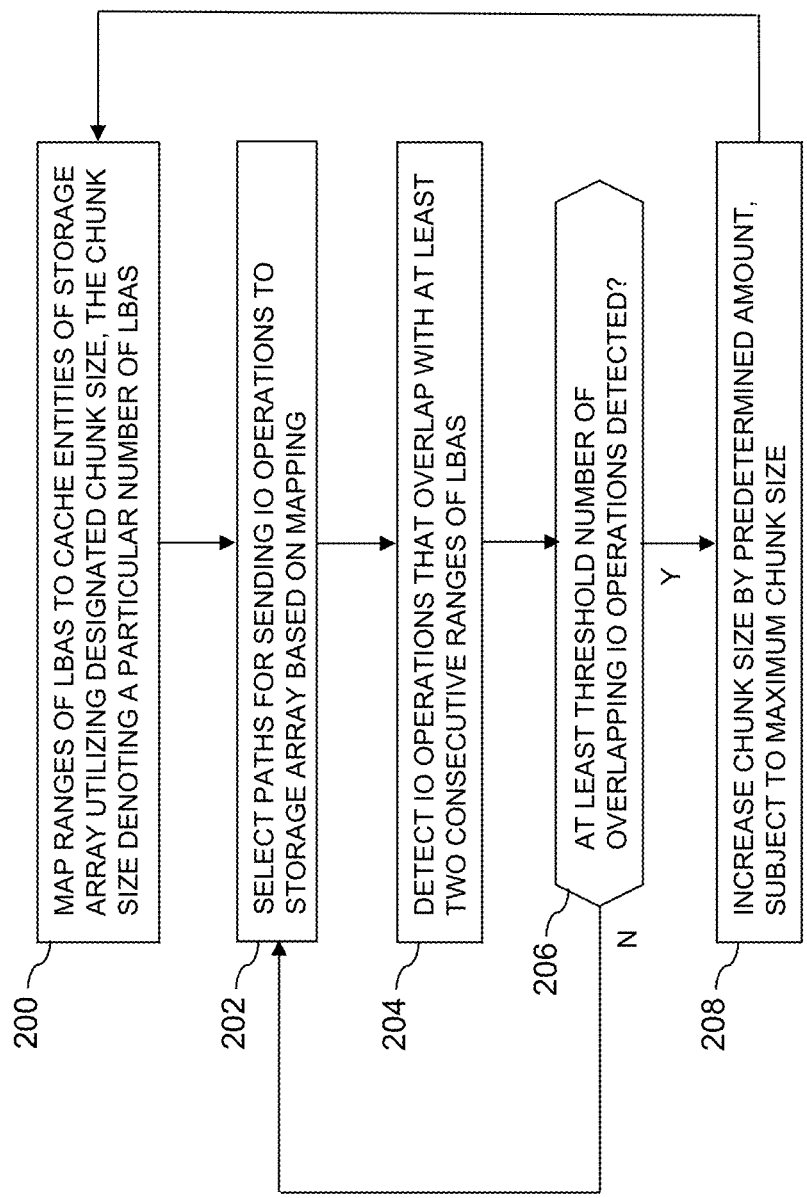
FIG. 2 is a flow diagram of a process for dynamic chunk size adjustment in a multi-path layer of a host device in an illustrative embodiment.

The steps of the FIG. 2 process are illustratively performed at least in part by or under the control of at least one host device, utilizing an MPIO driver of that host device. For example, portions of the process may be carried out under the control of software, firmware and/or hardware of an instance of chunk size adjustment logic deployed within the MPIO driver. Accordingly, the FIG. 2 process may be viewed as an example of an algorithm performed in part by the chunk size adjustment logic 115-1 of the MPIO driver 112-1 of host device 102-1, through interaction with storage array 105. Other arrangements of host device components, storage array components and/or other system components can be configured to perform at least portions of one or more of the steps in other embodiments.

In step 200, ranges of logical block addresses or LBAs are mapped to cache entities of the storage array utilizing a designated chunk size, where the chunk size illustratively denotes a particular number of LBAs. The chunk size may denote a particular number of LBAs in a variety of different ways. For example, the chunk size can be specified in terms of a number of LBAs or in terms of an amount of memory represented by that number of LBAs. Other techniques can be used to specify the chunk size in other embodiments, and the term "chunk size" as used herein is therefore intended to be broadly construed. Such mapping can occur in the host device 102-1. Alternatively, such mapping can occur in a different host device 102 and be communicated from that host device to the host device 102-1. As another example, the mapping can be performed by the MPIO management station 116 and then communicated or otherwise made available to each of the host devices 102.

In some embodiments, it is desirable to use the same chunk size and mapping in each of the host devices 102, and thus the mapping can be performed by one of the host devices 102 and then communicated to all of the other host devices 102, possibly via the MPIO management station 116, or can be performed by the MPIO management station 116 and then communicated or otherwise made available by the MPIO management station 116 to each of the host devices 102. Numerous other mapping arrangements can be used in other embodiments, and the disclosed embodiments are not limited in this regard.

In step 202, the MPIO driver 112-1 of the host device 102-1 utilizes the mapping determined in the manner described above to select paths for sending IO operations to the storage array 105. Such path selection is illustratively performed by or under the control of path selection logic 114-1 of the MPIO driver 112-1 through interaction with a stored mapping accessible to the MPIO driver 112-1. The path selection illustratively implements a storage cache aware load balancing policy as described elsewhere herein.

In step 204, the MPIO driver 112-1 monitors the IO operations in order to detect particular ones of the IO operations that each overlap with at least two consecutive ranges of LBAs. These particular IO operations are also referred to herein as "overlapping IO operations." Such overlapping IO operations may be read or write operations that target LBAs falling within multiple ones of the ranges of LBAs, and therefore target a portion of a LUN or other logical storage volume where the targeted portion is larger than the chunk size. The monitoring for overlapping IO operations in step 204 can occur at least in part prior to or in conjunction with the path selection of step 202. These and other steps of the FIG. 2 process can therefore at least in part overlap with one another.

In step 206, a determination is made as to whether or not at least a threshold number of overlapping IO operations has been detected. If at least the threshold number of overlapping 10 operations has been detected, the process moves to step 208 to increase the chunk size, and otherwise returns to step 202 as shown in order to continue utilizing the existing mapping based on the current chunk size.

In step 208, the chunk size is increased by a predetermined amount. For example, the chunk size may be automatically increased by a factor of two, which represents a doubling of the chunk size. Other types of increases in chunk size can be used. Such increases are illustratively subject to a specified maximum chunk size. Once the maximum chunk size is reached, no further increases in chunk size are made. After the chunk size is increased in step 208, the process returns to step 200 to generate a revised mapping utilizing the increased chunk size. Although not explicitly illustrated in FIG. 2, it is possible in some embodiments that the chunk size can subsequently be adjusted downward, possibly based on an absence of additional overlapping IOs for a particular period of time after the deployment of the revised mapping utilizing the increased chunk size.

Multiple additional instances of the FIG. 2 process may be performed for respective additional host devices that share the storage array. As indicated above, the MPIO management station 116 can be used in some embodiments to ensure that all of the host devices 102 are utilizing the same chunk size and its corresponding mapping of LBA ranges to cache entities of the storage array 105.

The particular processing operations and other system functionality described in conjunction with the flow diagram of FIG. 2 are presented by way of illustrative example only, and should not be construed as limiting the scope of the disclosure in any way. Alternative embodiments can use other types of processing operations involving host devices, storage systems and functionality for dynamic chunk size adjustment. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different dynamic chunk size adjustment arrangements within a given information processing system.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Figure 3:
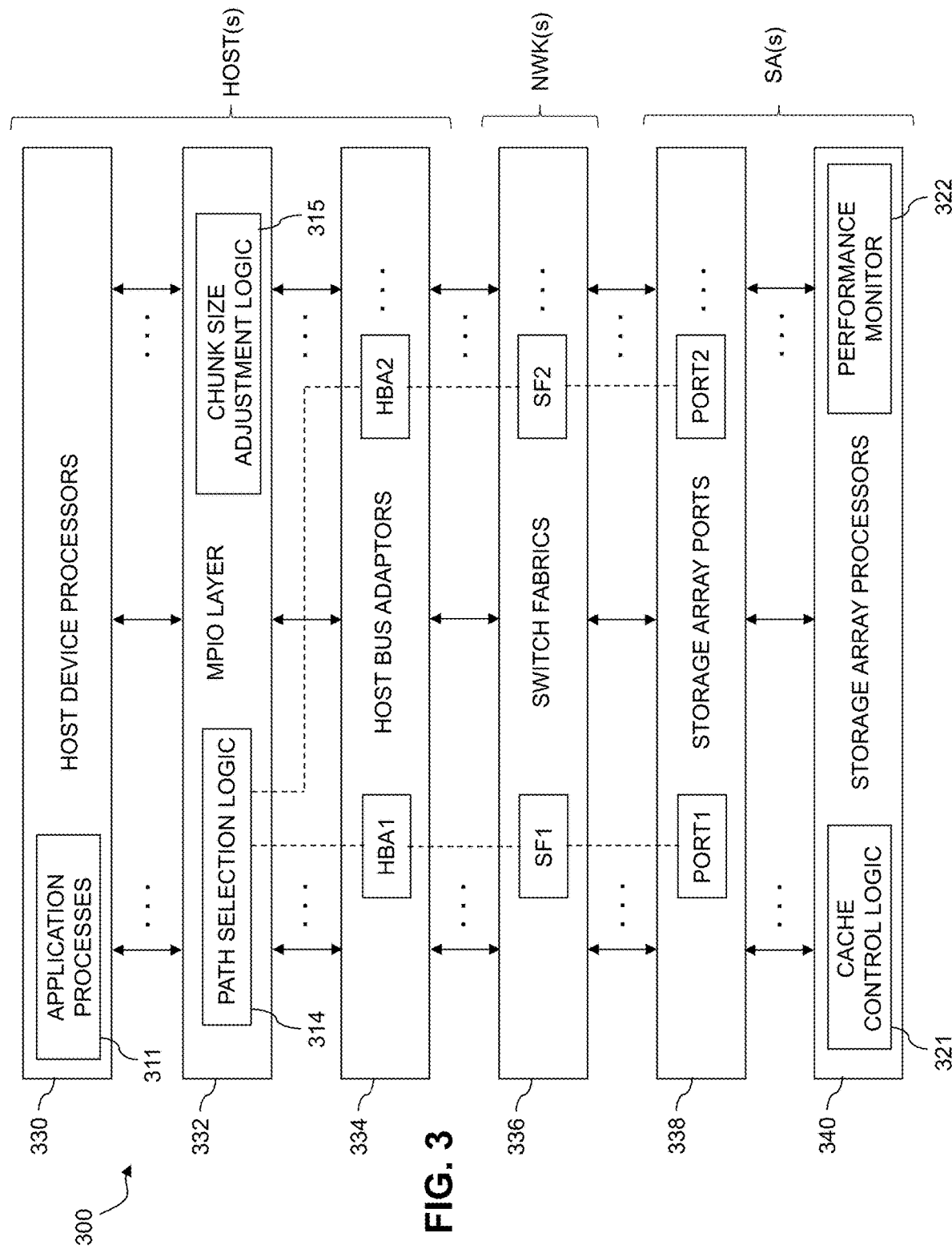
FIG. 3 is a block diagram showing multiple layers of a layered system architecture that includes a multi-path layer with functionality for dynamic chunk size adjustment in an illustrative embodiment.

Referring now to FIG. 3, another illustrative embodiment is shown. In this embodiment, an information processing system 300 comprises host-side elements that include application processes 311, path selection logic 314 and chunk size adjustment logic 315, and storage-side elements that include cache control logic 321 and performance monitor 322. The cache control logic 321 is configured to manage local caches of one or more storage arrays, although such local caches are not explicitly shown in the figure. There may be separate instances of one or more such elements associated with each of a plurality of system components such as host devices and storage arrays of the system 300.

In a manner similar to that described elsewhere herein, storage-side performance metrics associated with local caches and additional or alternative components of one or more storage arrays are generated by the performance monitor 322, and may be obtainable by one or more host devices via their respective MPIO drivers and utilized by the MPIO drivers to select a particular load balancing policy responsive to the storage-side performance metrics. The selected load balancing policy illustratively determines the manner in which IO operations are sent to particular logical storage devices of the one or more storage arrays over paths selected by the path selection logic 314. In some embodiments herein, it is assumed that a storage cache aware load balancing policy with dynamic chunk size adjustment is selected. Other types of load balancing policies, such as load balancing policies that are not storage cache aware, can be selected by the MPIO drivers, based at least in part on the storage-side performance metrics.

The system 300 is configured in accordance with a layered system architecture that illustratively includes a host device processor layer 330, an MPIO layer 332, an HBA layer 334, a switch fabric layer 336, a storage array port layer 338 and a storage array processor layer 340. The host device processor layer 330, the MPIO layer 332 and the HBA layer 334 are associated with one or more host devices, the switch fabric layer 336 is associated with one or more SANs or other types of networks, and the storage array port layer 338 and storage array processor layer 340 are associated with one or more storage arrays ("SAs").

The system 300 in this embodiment implements dynamic chunk size adjustment utilizing one or more MPIO drivers of the MPIO layer 332, and associated instances of chunk size adjustment logic 315. The application processes 311 generate IO operations that are processed by the MPIO layer 332 for delivery to the one or more storage arrays. Paths are determined by the path selection logic 314 for sending such IO operations to the one or more storage arrays. These IO operations are sent to the one or more storage arrays in accordance with a load balancing policy that may be selected by the MPIO driver based at least in part on storage-side performance metrics obtained by the MPIO driver for respective logical storage devices. For example, as indicated above, a storage cache aware load balancing policy with dynamic chunk size adjustment is illustratively selected. In accordance with such a storage cache aware load balancing policy, the chunk size adjustment logic 315 operates in cooperation with the path selection logic 314 in one or more MPIO drivers of the MPIO layer 332 to control delivery of IO operations in the manner disclosed herein. Again, a variety of other types of load balancing policies, such as load balancing policies that are not storage cache aware and that do not involve dynamic adjustment of chunk size, can be selected by the MPIO drivers, based at least in part on the storage-side performance metrics.

The MPIO layer 332 is an example of what is also referred to herein as a multi-path layer, and comprises one or more MPIO drivers implemented in respective host devices. Each such MPIO driver illustratively comprises respective instances of path selection logic 314 and chunk size adjustment logic 315 configured as previously described. Additional or alternative layers and logic arrangements can be used in other embodiments.

The cache control logic 321 implemented in the storage array processor layer 340 controls the configuration and operation of caches associated with respective cache entities of the system 300, such as multiple local caches associated with respective ones of a plurality of storage controllers of the system 300. For example, the cache control logic 321 can include functionality for allocating available cache resources among a plurality of cache entities of a given storage array of the system 300. It is also possible in some embodiments that the cache control logic 321 can include multiple distinct cache control logic instances for multiple sets of cache entities of respective ones of a plurality of storage arrays of the system 300.

In the system 300, path selection logic 314 is configured to select different paths for sending IO operations from a given host device to a storage array. These paths as illustrated in the figure include a first path from a particular HBA denoted HBA1 through a particular switch fabric denoted SF1 to a particular storage array port denoted PORT1, and a second path from another particular HBA denoted HBA2 through another particular switch fabric denoted SF2 to another particular storage array port denoted PORT2.

These two particular paths are shown by way of illustrative example only, and in many practical implementations there will typically be a much larger number of paths between the one or more host devices and the one or more storage arrays, depending upon the specific system configuration and its deployed numbers of HBAs, switch fabrics and storage array ports. For example, each host device in the FIG. 3 embodiment can illustratively have a set of n paths to a shared storage array, or alternatively different ones of the host devices can have different numbers and types of paths to the storage array.

The path selection logic 314 of the MPIO layer 332 in this embodiment selects paths for delivery of IO operations to the one or more storage arrays having the storage array ports of the storage array port layer 338. More particularly, the path selection logic 314 determines appropriate paths over which to send particular IO operations to particular logical storage devices of the one or more storage arrays, based at least in part on a stored mapping that is determined utilizing a particular chunk size.

It is assumed in this embodiment that the host devices through their respective MPIO drivers and respective instances of chunk size adjustment logic 315 provide functionality for dynamic chunk size adjustment as disclosed herein, possibly with involvement of other host device components such as the path selection logic 314, and additionally or alternatively with involvement of other system component such as an MPIO management station or other external server or system component.

Some implementations of the system 300 can include a relatively large number of host devices (e.g., 1000 or more host devices), although as indicated previously different numbers of host devices, and possibly only a single host device, may be present in other embodiments. Each of the host devices is typically allocated with a sufficient number of HBAs to accommodate predicted performance needs. In some cases, the number of HBAs per host device is on the order of 4, 8 or 16 HBAs, although other numbers of HBAs could be allocated to each host device depending upon the predicted performance needs. A typical storage array may include on the order of 128 ports, although again other numbers can be used based on the particular needs of the implementation. The number of host devices per storage array port in some cases can be on the order of 10 host devices per port. The HBAs of the host devices are assumed to be zoned and masked to the storage array ports in accordance with the predicted performance needs, including user load predictions.

A given host device of system 300 can be configured to initiate an automated path discovery process to discover new paths responsive to updated zoning and masking or other types of storage system reconfigurations performed by a storage administrator or other user. For certain types of host devices, such as host devices using particular operating systems such as Windows, ESX or Linux, automated path discovery via the MPIO drivers of a multi-path layer is typically supported. Other types of host devices using other operating systems such as AIX in some implementations do not necessarily support such automated path discovery, in which case alternative techniques can be used to discover paths.

Additional illustrative embodiments will now be described. It is assumed in these embodiments that the MPIO driver of a given host device provides at least portions of the disclosed dynamic chunk size adjustment functionality, possibly with involvement of one or more other host device components.

Referring now to FIG. 4, an example of storage-side performance information 400 maintained by a storage system such as storage array 105 is shown. The storage-side performance information 400 is illustratively maintained by the storage array 105 for particular LUNs that are denoted LUN 1, LUN 2, . . . LUN X in the figure. These LUNs may comprise all of the LUNs of the storage array 105, or a designated subset of the LUNs of the storage array 105. Different sets of storage-side performance information similar to storage-side performance information 400 may be maintained for respective different sets of LUNs of the storage array 105. The storage-side performance information 400 may be viewed as one possible example of storage-side performance information 122 of storage array 105 in the FIG. 1 embodiment, illustratively generated by a corresponding performance monitor not explicitly shown in FIG. 1. Similar storage-side performance information may be generated by performance monitor 322 in the FIG. 3 embodiment.

The storage-side performance information 400 more particularly includes cache-related performance metrics for each of the LUNs denoted LUN 1 through LUN X. The storage-side performance measurements in some embodiments can additionally or alternatively comprise other types of performance metrics, such as response time (RT) measurements compiled by the storage array 105 over a designated time period for IO operations directed to the corresponding LUNs. Additional or alternative performance metrics that can be used in generating the performance measurements that are part of the storage-side performance information include, for example, at least one of a write count, a write pending count and a bandwidth consumption for IO operations directed to the corresponding LUNs.

At least portions of the storage-side performance information 400 are obtainable by the MPIO drivers of respective host devices and is utilized by those MPIO drivers in selecting a particular type of load balancing policy for use in delivering IO operations to the storage array as disclosed herein. For example, a storage cache aware load balancing policy with dynamically adjustable chunk size may be selected.

The particular storage-side performance information arrangement shown in FIG. 4 is only an example, and numerous other types and arrangements of storage-side performance information can be maintained by a storage system in other embodiments. Terms such as "storage-side performance information" as used herein are intended to be broadly construed.

As indicated above, the MPIO driver of a given one of the host devices 102 can obtain storage-side performance information from the storage array 105 by sending commands to the storage array 105, in the manner previously described.

The storage-side performance information 400 is illustratively stored in a storage array memory accessible to a multi-path layer of the host device. Other types of data structures can be used in other embodiments.

On the host side, at least portions of such storage-side performance information obtained from the storage array and characterizing one or more logical storage devices are illustratively stored in a data structure of a kernel-space portion of the MPIO driver 112-1, although other storage arrangements with other types of data structures can be used.

In some embodiments, an MPIO driver obtains performance information directly from a storage array, through interaction with the storage array as described elsewhere herein. For example, MPIO driver 112-1 is illustratively configured to obtain the storage-side performance information directly from the storage array 105 utilizing an in-band communication mechanism in which one or more commands in a designated storage protocol are sent from the MPIO driver 112-1 or another host device component to the storage array 105.

However, it is possible in some embodiments that one or more MPIO drivers of one or more host devices can obtain the storage-side performance information other than through direct communication with the storage array. Such arrangements illustratively involve obtaining the connectivity information indirectly from the storage array utilizing an out-of-band communication mechanism via at least one intermediary device, such as the MPIO management station 116, which may comprise one or more servers.

Additional illustrative embodiments will now be described with reference to FIGS. 5 and 6. It is assumed in these embodiments that the MPIO driver of a given host device provides the disclosed storage cache aware processing functionality, under the control of a corresponding instance of path selection logic implemented in the MPIO driver, possibly with involvement of one or more other host device components. The storage cache aware processing is an example of what is also referred to herein as a storage cache aware load balancing policy, illustratively selected for use based at least in part on obtained storage-side performance information, possibly supplemented in some embodiments by host-side performance information. The storage cache aware load balancing policy illustratively utilizes a dynamically adjustable chunk size controlled by a chunk size adjustment logic instance of the MPIO driver. References to "chunk size" in the embodiments of FIGS. 5 and 6 should be understood to refer to a chunk size that is dynamically adjustable in the manner described elsewhere herein. It is also to be appreciated that the particular features and functionality of the embodiments of FIGS. 5 and 6 as described below can be varied in other embodiments.

Figure 5:
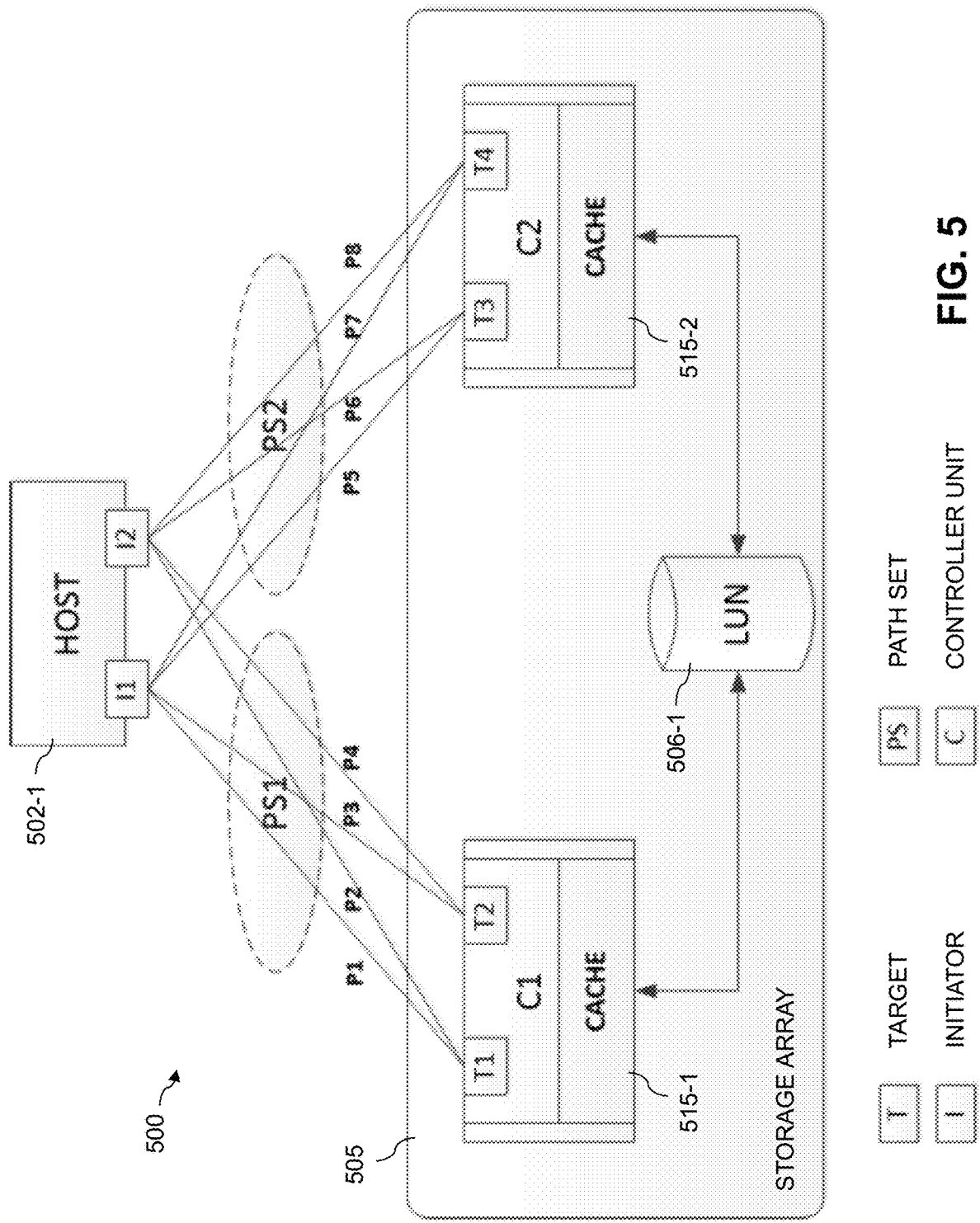
FIGS. 5 and 6 show an example of storage cache aware processing of IO operations in accordance with a storage cache aware load balancing policy of a multi-path layer of a host device in an illustrative embodiment.

Referring initially to FIG. 5, an information processing system 500 comprises a host device 502-1 coupled to a storage array 505. The host device 502-1 comprises initiators I1 and I2 that communicate with targets T1, T2, T3 and T4 over a plurality of paths as shown. The paths are associated with respective initiator-target pairs. For example, a path P1 is associated with the initiator-target pair I1-T1, a path P2 is associated with the initiator-target pair I2-T1, and so on for the other paths. The initiators I1 and I2 illustratively comprise respective HBAs of the host device 502-1, and the targets T1 through T4 illustratively comprise respective ports of the storage array 505. The paths in this embodiment are arranged in first and second path sets denoted as path set PS1 and path set PS2. Path set PS1 comprises paths P1, P2, P3 and P4, which and path set PS2 comprises paths P5, P6, P7 and P8. It is assumed that the host device 502-1 comprises an MPIO driver of the type described elsewhere herein, suitably configured to provide storage cache aware control of delivery of IO operations to the storage array 505 over selected ones of the paths of the path sets PS1 and PS2.

The storage array 505 comprises at least one LUN 506-1 and first and second controller units C1 and C2 associated with respective first and second caches 515-1 and 515-2. The LUN 506-1 is accessible via the controller units C1 and C2 utilizing their respective caches 515-1 and 515-2. The first controller unit C1 includes the targets T1 and T2, and illustratively comprises a first storage controller having first cache 515-1 as its local cache. Similarly, the second controller unit C2 includes the targets T3 and T4, and illustratively comprises a second storage controller having second cache 515-2 as its local cache. The controller units C1 and C2 are examples of what are more generally referred to herein as respective "cache entities" of the storage array 505, and may in some cases include their respective caches 515-1 and 515-2. Alternatively, the caches 515-1 and 515-2 are arranged outside of the controller units C1 and C2, as in the particular arrangement illustrated in the figure. Also, other types of cache entities can be used in other embodiments. For example, alternative cache entities in some embodiments can include lower level components that are part of a storage hierarchy of the storage array 505 and have local caches associated therewith.

As indicated above, the LUN 506-1 of storage array 505 is accessible from host device 502-1 via eight paths P1 through P8, with each of the controller units C1 and C2 handling IO operations arriving on the four paths of the respective path sets PS1 and PS2.

It is to be appreciated that different numbers, types and arrangements of hosts, storage arrays, controller units, caches, initiators, targets, path sets and LUNs can be used in other embodiments.

In the FIG. 5 embodiment, the host device 502-1 is assumed to store a mapping between ranges of LBAs of the LUN 506-1 and respective cache entities comprising the first and second controller units C1 and C2.

Figure 6:
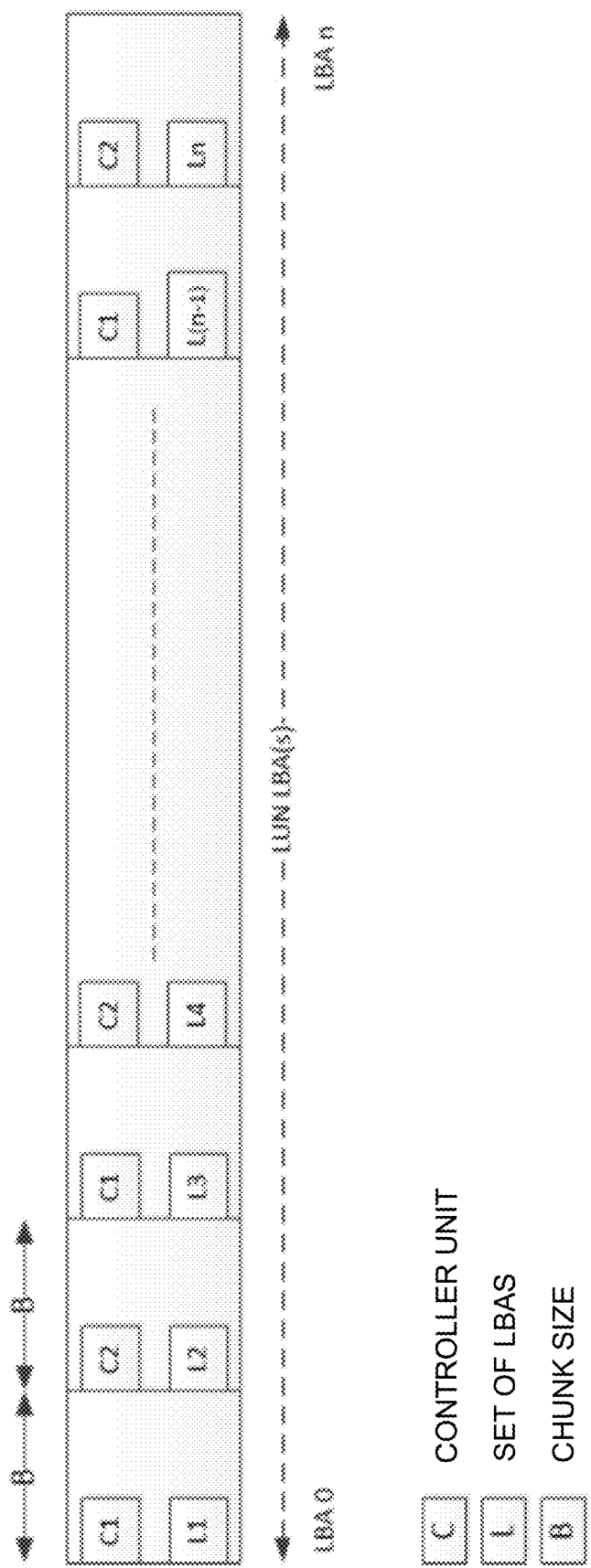

For example, with reference to FIG. 6, the LUN 506-1 illustratively comprises a plurality of LBAs denoted as LBA 0 through LBA n. The total number of LBAs for a given LUN can be determined using a "read capacity" command or other similar command of a given storage protocol. The stored mapping is generated using a specified chunk size B that illustratively denotes a particular number of LBAs. In the FIG. 5 example, the stored mapping associates different ranges of LBAs of LUN 506-1 with different ones of the first and second controller units C1 and C2. Each of the LBA ranges, also referred to in this example as respective sets of LBAs, has the designated chunk size B.

Accordingly, the LBAs of the LUN 506-1 are divided into separate ranges each of chunk size B, although it is possible in other embodiments that, depending on the particular size of the LUN, it may not be evenly divisible by the chunk size B, in which case a final one of the ranges may have a different size than the others. Also, although an even division of the LBAs into LBA ranges having chunk size B is used in the FIG. 5 example, other techniques may be used to separate the LBAs of a LUN into LBA ranges in other embodiments.

The different LBA ranges are assigned to the controller units C1 and C2 in the manner illustrated in FIG. 5. For example, LBA range L1 is assigned to C1, LBA range L2 is assigned to C2, LBA range L3 is assigned to C1, LBA range L4 is assigned to C2, . . . LBA range L(n−1) is assigned to C1, and LBA range Ln is assigned to C2. The resulting assignments when stored in the host device 502-1 provide an example of what is more generally referred to herein as a "stored mapping" between ranges of LBAs and respective ones of a plurality of cache entities of the storage array 505.

An example default chunk size B suitable for use in some embodiments is 4096 LBAs, although other chunk sizes can be used. The LBA ranges in the FIG. 5 example are mapped to the cache entities in an alphanumeric sorted order of the cache entities, and so beginning with the first controller unit C1 and then alternating between C1 and C2 until all LBA ranges are mapped to a controller unit. Multiple ones of the LBA ranges are therefore mapped to the same controller unit in this embodiment.

The process of mapping the LBA ranges to the controller units C1 and C2 is illustratively performed in the MPIO driver of the host device 502-1. The chunk size can be globally configured to a particular default value that is determined to work well across multiple different storage arrays of different types. The chunk size can instead be set individually to different values for different storage arrays of different types.

Additionally or alternatively, different chunk sizes can be used for different LUNs within a given storage array. Thus, the stored mapping for one LUN of a storage array can be generated using a different chunk size than that used to generate the stored mapping for another LUN of the storage array. Other factors can be taken into account in determining an appropriate chunk size in a given embodiment, such as the type of application or applications utilizing the LUN and their typical IO workload sizes. Such adjustments in chunk size or other parameters relating to generation of a stored mapping as disclosed herein can be implemented, for example, utilizing a user input configuration file, or utilizing a command line interface (CLI) to configure software of the hos device.

It should be noted that a resizing operation or other similar operation that significantly alters the configuration of the LUN 506-1 will generally necessitate that the MPIO driver generate an updated mapping for that LUN. As indicated previously, different mappings are generally stored by a host device for different LUNs of a storage array in illustrative embodiments. Such updating of one or more of the stored mappings can be event driven based on a change notification or manually triggered through a CLI.

In operation, the MPIO driver of the host device 502-1 provides storage cache aware processing of IO operations using the stored mapping as described above. More particularly, for each of at least a subset of the IO operations, the MPIO driver identifies a particular one of the cache entities based at least in part on an LBA of the IO operation and the stored mapping, and selects a particular one of the paths for delivery of the IO to the storage array 505 based at least in part on the identified cache entity.

For a given IO operation, the MPIO driver generally has information such as the target LUN, possibly identified by its major and minor numbers, to which the IO operation is directed, as well as a starting LBA of the IO operation, a number of logical blocks to be transferred, also referred to as the transfer length, and the target LUN size, which specifies the total number of LBAs in the target LUN.

The MPIO driver is also configured to obtain information from the storage array 505 regarding its cache entity configuration, such as the identities of the cache controllers C1 and C2 having respective caches 515-1 and 515-2 associated therewith. Such information can be stored in a kernel-space data structure of the MPIO driver of the host device 502-1, or elsewhere in the host device 502-1. The cache entity configuration can include an identification of particular cache entities of the storage array 505 that have respective caches associated therewith. Although in the FIG. 5 embodiment, the cache entities are the controller units C1 and C2 having respective caches 515-1 and 515-2, in other embodiments other types of cache entities can be present, such as storage processors, directors, bricks or other components of a storage hierarchy of a given storage array or other storage system. The cache entity configuration also illustratively includes various characteristics of the caches associated with the respective cache entities, and may further include a particular chunk size designation. As mentioned elsewhere herein, the host device 502-1 can obtain such information from the storage array 505 using various in-band mechanisms such as particular standard or vendor unique commands of a storage protocol. Out-of-band mechanisms can additionally or alternatively be used. At least portions of the cache entity configuration information can be provided in advance by a storage array vendor and implemented directly in host software.

A more particular example of an algorithm implemented by an MPIO driver of the host device 502-1 to provide storage cache aware processing of IO operations using the stored mapping is as follows, for a given IO operation:

1. Determine the LBA offset and the transfer length of the IO operation.
2. From the LBA offset and the transfer length, calculate a midpoint LBA for the IO operation.
3. From the chunk size and the midpoint LBA, identify a particular LBA range having the chunk size that contains the midpoint LBA.
4. From the identified LBA range, identify a particular controller unit using the stored mapping of LBA ranges to controller units.
5. From the identified controller unit, identify a corresponding path set.
6. Select a path for delivery of the IO operation to the storage array 505 from the identified path set.

As a more particular illustration of the above algorithm, consider an example in which an IO operation has an LBA offset of 5000 and a transfer length of 1000, resulting in a midpoint LBA that is given by $$5000 + \frac{1000}{2} = 5500.$$

Using a chunk size B of 4096, and with reference to FIG. 5, the identified LBA range is L2, which is associated with controller unit C2 in the stored mapping. Accordingly, the multi-path layer of host device 502-1 will utilize a path selected from the path set PS2, namely, a selected one of the paths P5, P6, P7 or P8, in delivering the IO operation to controller unit C2.

In these examples, a path set is selected for a given IO operation based on its midpoint LBA, thereby increasing the likelihood that subsequent related IO operations will result in cache hits in the local cache of the corresponding controller unit. It should be noted that different LBAs other than the midpoint LBA can be used in determining a path set via the stored mapping as described above. For example, an approximate midpoint LBA can be used, such as an LBA that is slightly above or below the midpoint LBA. Other types of LBAs other than a starting or ending LBA can similarly be used for this purpose.

Once a particular path set is determined for a given IO operation using the stored mapping which relates LBA ranges to respective controller units or other cache entities of the storage array, only the paths of that path set are considered for selection for delivery of that IO operation to the storage array in implementing load balancing or failover policy execution functionality of the multi-path layer. Within the path set, a particular path can be selected using a designated path selection algorithm, such as least recently used (LRU), most recently used (MRU), round robin, adaptive, or numerous others.

In some embodiments, if a given IO operation spans more than one LBA range having the designated chunk size, that IO operation may still be sent to the storage array using a path selected from the particular path set determined using the midpoint LBA, but possibly with additional information that indicates to the storage array that the corresponding cache should be bypassed for the given IO operation. By way of example, information such as a Force Unit Access (FUA) bit and a Disable Page Out (DPO) bit may be set in a SCSI command representing the IO operation. Similar arrangements in other storage protocols can be used to avoid an undesirable splitting of the given IO operation.

For situations in which all paths of a given path set are indicated as not serviceable, the system can be configured by default to select a different path set to service the IO operation, possibly instead of or in addition to reporting the failure to the application that generated the 10 operation. Users can be permitted to override or otherwise adjust the default behavior in a given embodiment.

The above-described processes, algorithms and other features and functionality disclosed herein are presented by way of illustrative example only, and other embodiments can utilize additional or alternative arrangements.

Also, as mentioned previously, different instances of the above-described processes, algorithms and other dynamic chunk size adjustment techniques can be performed by different MPIO drivers in different host devices, or using other types of host drivers, such as, for example, iSCSI drivers.

The particular dynamic chunk size adjustment arrangements described above are therefore presented by way of illustrative example only. Numerous alternative arrangements of these and other features can be used in implementing the dynamic chunk size adjustment in other illustrative embodiments.

As indicated previously, illustrative embodiments disclosed herein can provide a number of significant advantages relative to conventional arrangements.

For example, these embodiments provide an efficient algorithm for dynamic chunk size adjustment in storage cache aware load balancing.

Illustrative embodiments can therefore prevent significant degradations in IO processing performance that might otherwise occur due to excessive cache misses and slot collisions in storage cache aware load balancing.

As an illustration, one or more such embodiments advantageously achieve an approximately 50% reduction of contentions on the storage array side by doubling the chunk size responsive to at least a threshold amount of detected overlapping IO operations. This substantially reduces the latency of the IO operations and hence significantly improves the overall performance of the system.

Some embodiments configure a multi-path layer of one or more host devices to include functionality for storage cache aware processing of IO operations using a dynamically adjustable chunk size that provides improved load balancing relative to conventional approaches.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

It was noted above that portions of an information processing system as disclosed herein may be implemented using one or more processing platforms. Illustrative embodiments of such platforms will now be described in greater detail. These and other processing platforms may be used to implement at least portions of other information processing systems in other embodiments. A given such processing platform comprises at least one processing device comprising a processor coupled to a memory.

One illustrative embodiment of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as virtual machines, or portions thereof, are illustratively implemented for use by tenants of such a multi-tenant environment.

Cloud infrastructure as disclosed herein can include cloud-based systems such as Amazon Web Services, Google Cloud Platform and Microsoft Azure. Virtual machines provided in such systems can be used to implement a fast tier or other front-end tier of a multi-tier storage system in illustrative embodiments. A capacity tier or other back-end tier of such a multi-tier storage system can be implemented using one or more object stores such as Amazon S3, Google Cloud Platform Cloud Storage, and Microsoft Azure Blob Storage.

In some embodiments, the cloud infrastructure additionally or alternatively comprises a plurality of containers illustratively implemented using respective operating system kernel control groups of one or more container host devices. For example, a given container of cloud infrastructure illustratively comprises a Docker container or other type of LXC implemented using a kernel control group. The containers may run on virtual machines in a multi-tenant environment, although other arrangements are possible. The containers may be utilized to implement a variety of different types of functionality within the system 100. For example, containers can be used to implement respective compute nodes or storage nodes of a cloud-based system. Again, containers may be used in combination with other virtualization infrastructure such as virtual machines implemented using a hypervisor.

Another illustrative embodiment of a processing platform that may be used to implement at least a portion of an information processing system comprises a plurality of processing devices which communicate with one another over at least one network. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an application-specific integrated circuit (ASIC), a field-programmable gate array (FPGA), a graphics processing unit (GPU) or other type of processing circuitry, as well as portions or combinations of such circuitry elements. The memory may comprise random access memory (RAM), read-only memory (ROM), flash memory or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

As another example, portions of a given processing platform in some embodiments can comprise converged infrastructure such as VxRail™, VxRack™, VxRack™ FLEX, VxBlock™, or Vblock® converged infrastructure from Dell Technologies.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system as disclosed herein. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of host devices 102, SAN 104 and storage array 105 are illustratively implemented in the form of software running on one or more processing devices. As a more particular example, the instances of path selection logic 114 and chunk size adjustment logic 115 may be implemented at least in part in software, as indicated previously herein.

It should again be emphasized that the above-described embodiments are presented for purposes of illustration only. Many variations and other alternative embodiments may be used. For example, the disclosed techniques are applicable to a wide variety of other types of information processing systems, utilizing other arrangements of host devices, networks, storage systems, storage arrays, storage devices, processors, memories, IO queues, MPIO drivers, path selection logic, chunk size adjustment logic and additional or alternative components. Also, the particular configurations of system and device elements and associated processing operations illustratively shown in the drawings can be varied in other embodiments. For example, a wide variety of different host device configurations and associated dynamic chunk size adjustment arrangements can be used in other embodiments. Moreover, the various assumptions made above in the course of describing the illustrative embodiments should also be viewed as exemplary rather than as requirements or limitations. Numerous other alternative embodiments within the scope of the appended claims will be readily apparent to those skilled in the art.

What is claimed is:

1. An apparatus comprising:
   at least one processing device comprising a processor coupled to a memory;
   wherein the at least one processing device is configured:
   to separate logical block addresses of one or more storage devices of a storage system into a plurality of ranges of logical block addresses using a designated chunk size, the chunk size denoting a particular number of logical block addresses;
   to assign different ones of the ranges of logical block addresses to different ones of a plurality of cache entities of the storage system;
   to select paths for delivery of respective input-output operations from a host device to the storage system based at least in part on the assigning;
   to detect particular ones of the input-output operations that each overlap with two or more adjacent ranges of the plurality of ranges; and
   responsive to the detected input-output operations exceeding a threshold, to modify the chunk size and to repeat at least portions of the separating, assigning, selecting and detecting utilizing the modified chunk size.

2. The apparatus of claim 1 wherein the at least one processing device comprises at least a portion of the host device.

3. The apparatus of claim 1 wherein at least portions of the separating, assigning, selecting and detecting are implemented in a multi-path layer comprising at least one multi-path input-output driver of the host device.

4. The apparatus of claim 1 wherein one or more of the cache entities are each assigned multiple distinct ones of the ranges of logical block addresses.

5. The apparatus of claim 1 wherein a mapping of assignments of ranges of logical block addresses to respective ones of the cache entities is stored in the host device and accessed in conjunction with selecting the paths for delivery of the input-output operations to the storage system.

6. The apparatus of claim 1 wherein selecting paths for delivery of respective input-output operations comprises:
   accessing for a given one of the one or more storage devices a stored mapping between ranges of logical block addresses of the storage device and respective ones of a plurality of cache entities of the storage system; and
   for each of at least a subset of the input-output operations:
   identifying a particular one of the cache entities based at least in part on a logical block address of the input-output operation and the stored mapping; and
   selecting a particular one of a plurality of paths for delivery of the input-output operation to the storage system based at least in part on the identified cache entity.

7. The apparatus of claim 1 wherein the cache entities of the storage system comprise respective components of the storage system that have respective local caches associated therewith.

8. The apparatus of claim 7 wherein the cache entities of the storage system comprise respective storage controllers of the storage system with each such storage controller having a different local cache associated therewith.

9. The apparatus of claim 1 wherein modifying the chunk size comprises doubling the chunk size.

10. The apparatus of claim 1 wherein modifying the chunk size comprises modifying the chunk size subject to a specified maximum chunk size.

11. The apparatus of claim 1 wherein the threshold is specified in terms of a number of detected input-output operations within a monitoring interval.

12. The apparatus of claim 1 wherein the threshold is specified in terms of a percentage of detected input-output operations relative to a total number of issued input-output operations within a monitoring interval.

13. The apparatus of claim 1 wherein the chunk size is modified responsive to the detected input-output operations exceeding the threshold in a first interval, and wherein said at least one processing device is further configured to modify the chunk size in each of one or more additional intervals in which the detected input-output operations that each overlap with two or more adjacent ranges of the plurality of ranges exceed the threshold.

14. The apparatus of claim 1 wherein the at least one processing device is further configured:
   to determine whether or not a maximum chunk size has been reached; and
   responsive to detection of one or more additional input-output operations that each overlap with two or more adjacent ranges of the plurality of ranges after the maximum chunk size has been reached, to modify one or more commands associated with the one or more additional detected input-output operations to bypass utilization of one or more cache entities of the storage system.

15. A computer program product comprising a non-transitory processor-readable storage medium having stored therein program code of one or more software programs, wherein the program code, when executed by at least one processing device comprising a processor coupled to a memory, causes the at least one processing device:

to separate logical block addresses of one or more storage devices of a storage system into a plurality of ranges of logical block addresses using a designated chunk size, the chunk size denoting a particular number of logical block addresses;

to assign different ones of the ranges of logical block addresses to different ones of a plurality of cache entities of the storage system;

to select paths for delivery of respective input-output operations from a host device to the storage system based at least in part on the assigning;

to detect particular ones of the input-output operations that each overlap with two or more adjacent ranges of the plurality of ranges; and responsive to the detected input-output operations exceeding a threshold, to modify the chunk size and to repeat at least portions of the separating, assigning, selecting and detecting utilizing the modified chunk size.

16. The computer program product of claim 15 wherein the chunk size is modified responsive to the detected input-output operations exceeding the threshold in a first interval, and the program code, when executed by the at least one processing device, further causes the at least one processing device to modify the chunk size in each of one or more additional intervals in which the detected input-output operations that each overlap with two or more adjacent ranges of the plurality of ranges exceed the threshold.

17. The computer program product of claim 15 wherein the program code, when executed by the at least one processing device, further causes the at least one processing device:

to determine whether or not a maximum chunk size has been reached; and responsive to detection of one or more additional input-output operations that each overlap with two or more adjacent ranges of the plurality of ranges after the maximum chunk size has been reached, to modify one or more commands associated with the one or more additional detected input-output operations to bypass utilization of one or more cache entities of the storage system.

18. A method comprising:

separating logical block addresses of one or more storage devices of a storage system into a plurality of ranges of logical block addresses using a designated chunk size, the chunk size denoting a particular number of logical block addresses;

assigning different ones of the ranges of logical block addresses to different ones of a plurality of cache entities of the storage system;

selecting paths for delivery of respective input-output operations from a host device to the storage system based at least in part on the assigning;

detecting particular ones of the input-output operations that each overlap with two or more adjacent ranges of the plurality of ranges; and responsive to the detected input-output operations exceeding a threshold, modifying the chunk size and repeating at least portions of the separating, assigning, selecting and detecting utilizing the modified chunk size.

19. The method of claim 18 wherein the chunk size is modified responsive to the detected input-output operations exceeding the threshold in a first interval, and the method further comprises modifying the chunk size in each of one or more additional intervals in which the detected input-output operations that each overlap with two or more adjacent ranges of the plurality of ranges exceed the threshold.

20. The method of claim 18 further comprising:

determining whether or not a maximum chunk size has been reached; and responsive to detection of one or more additional input-output operations that each overlap with two or more adjacent ranges of the plurality of ranges after the maximum chunk size has been reached, modifying one or more commands associated with the one or more additional detected input-output operations to bypass utilization of one or more cache entities of the storage system.

* * * * *